C. M. CONRADSON.
AUTOMATIC MULTIPLE SPINDLE LATHE.
APPLICATION FILED MAR. 30, 1914.

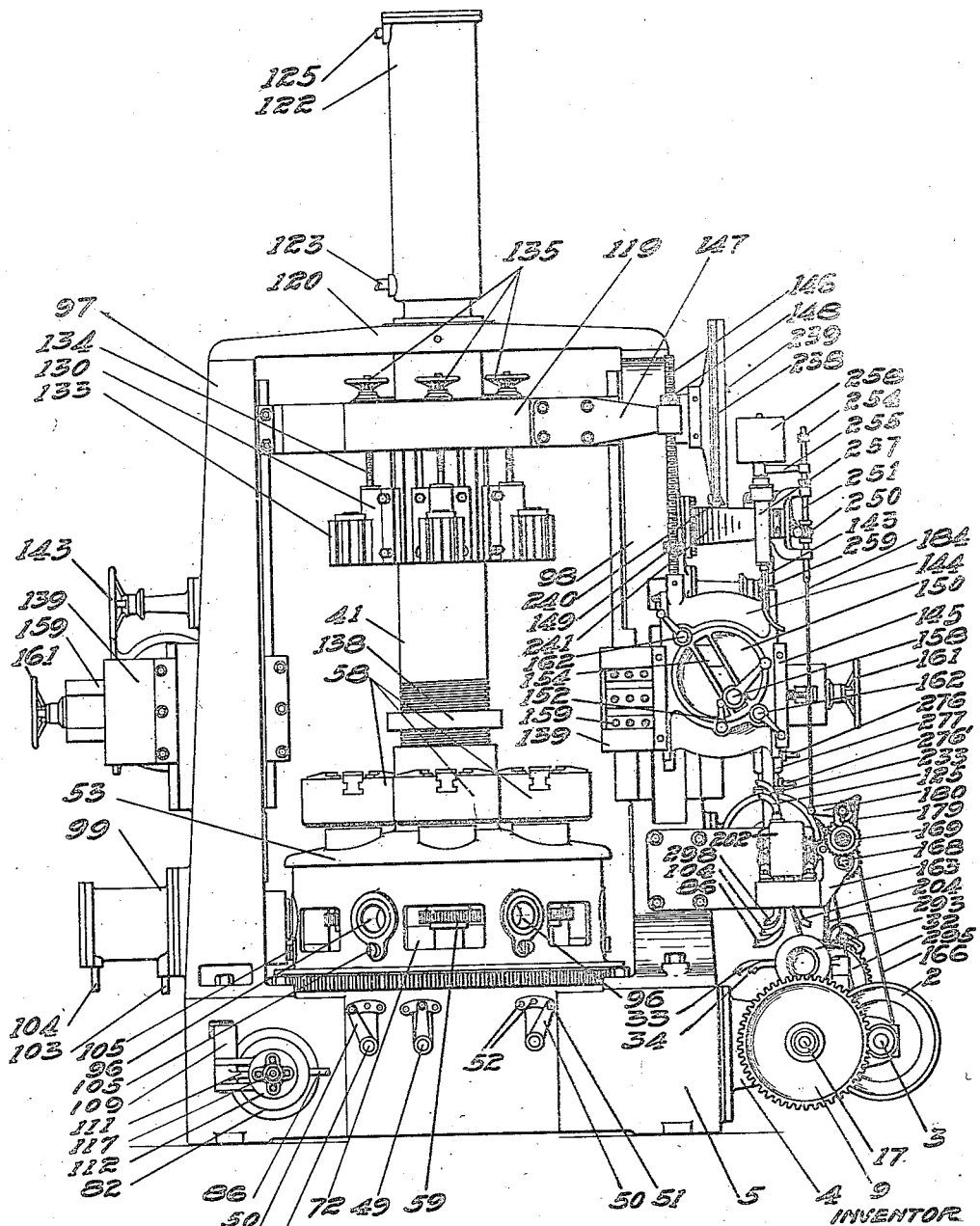

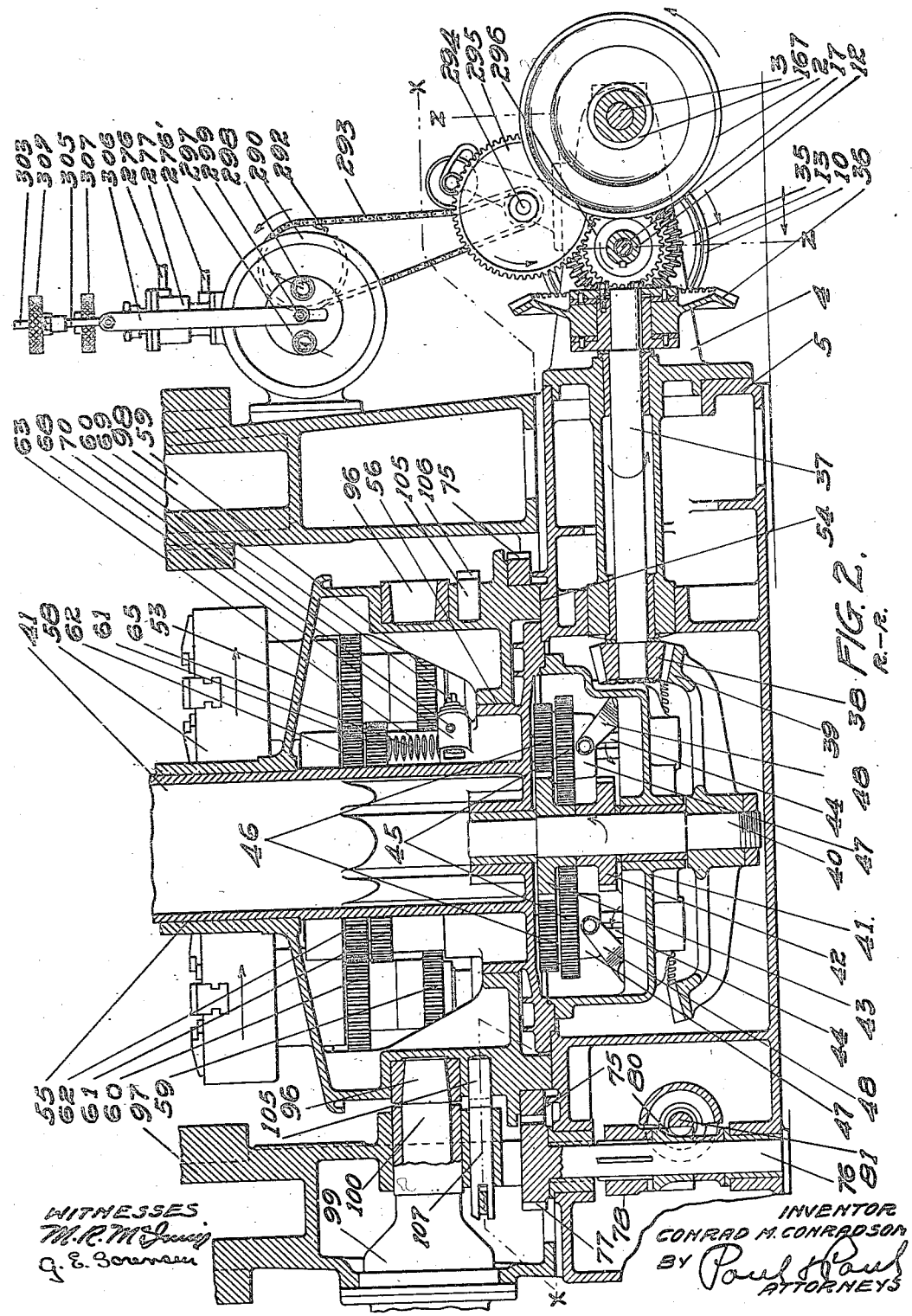

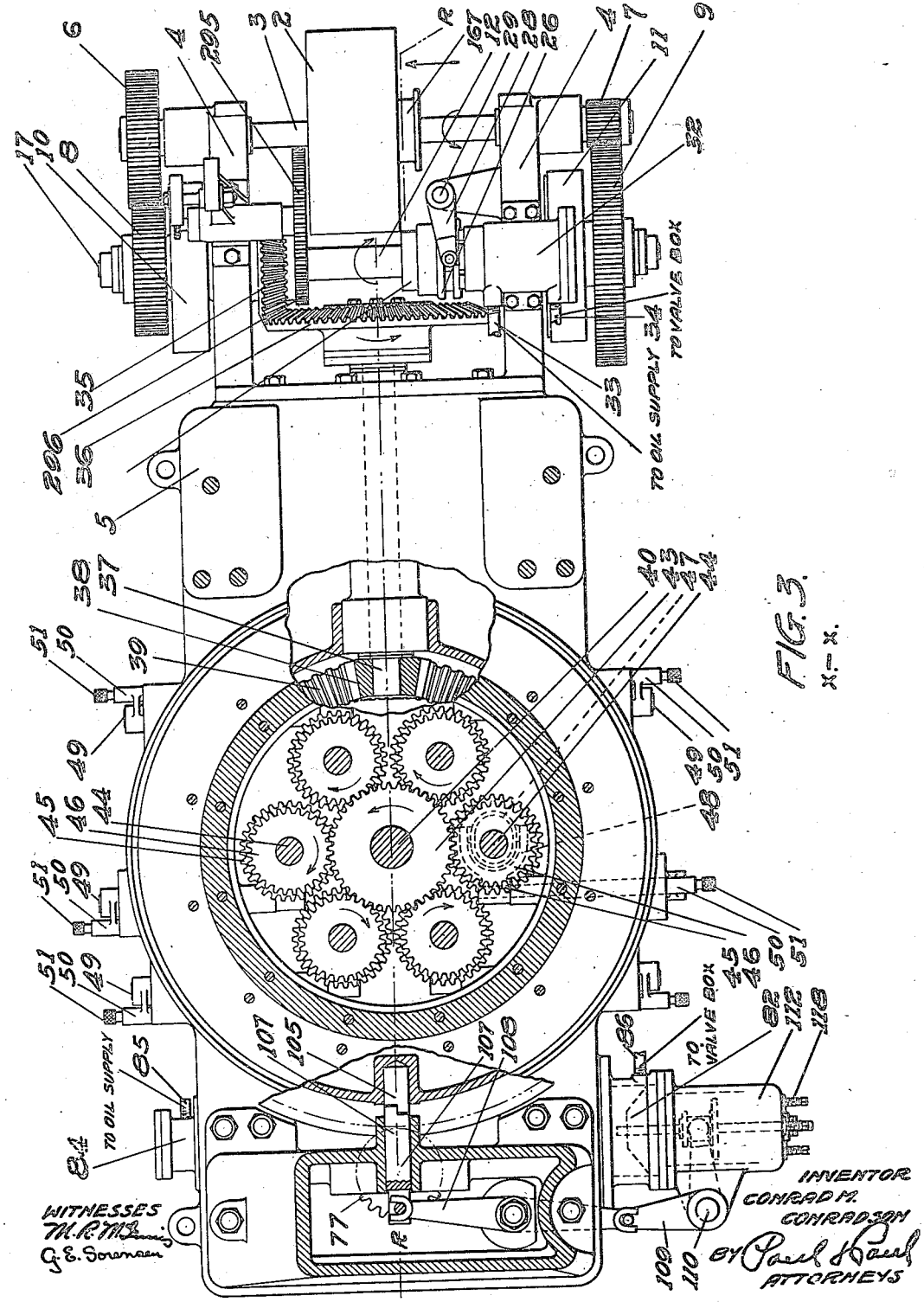

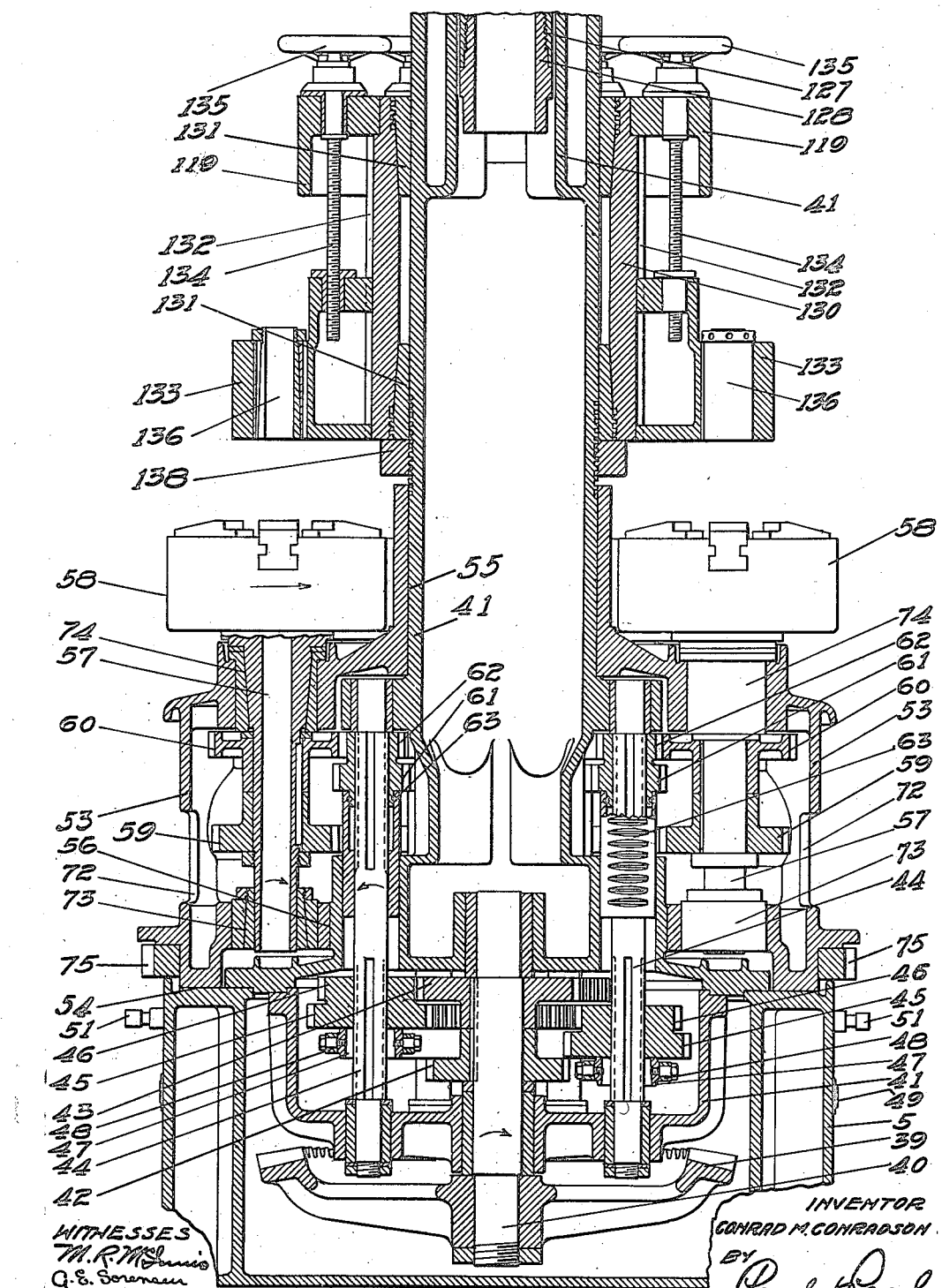

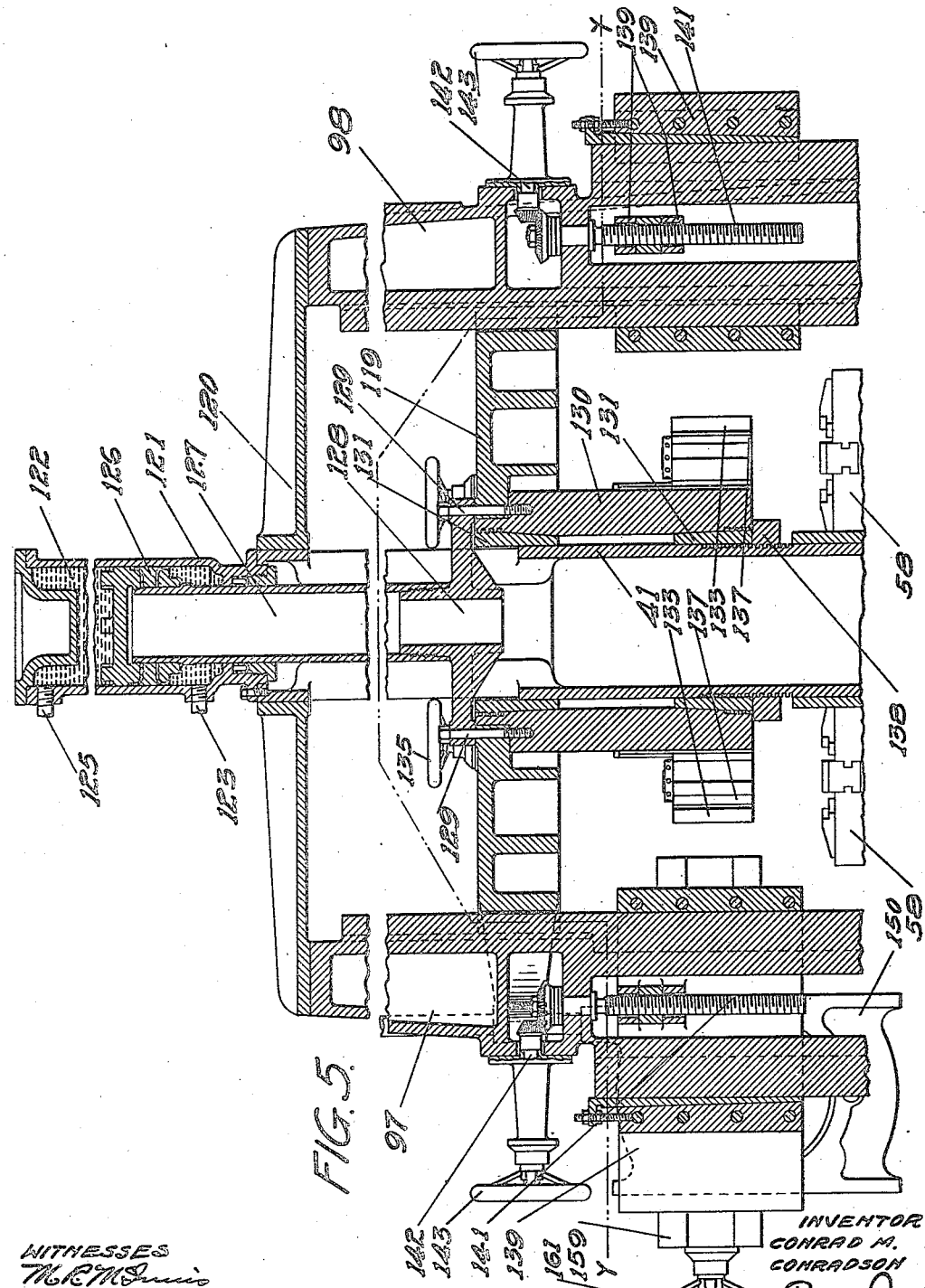

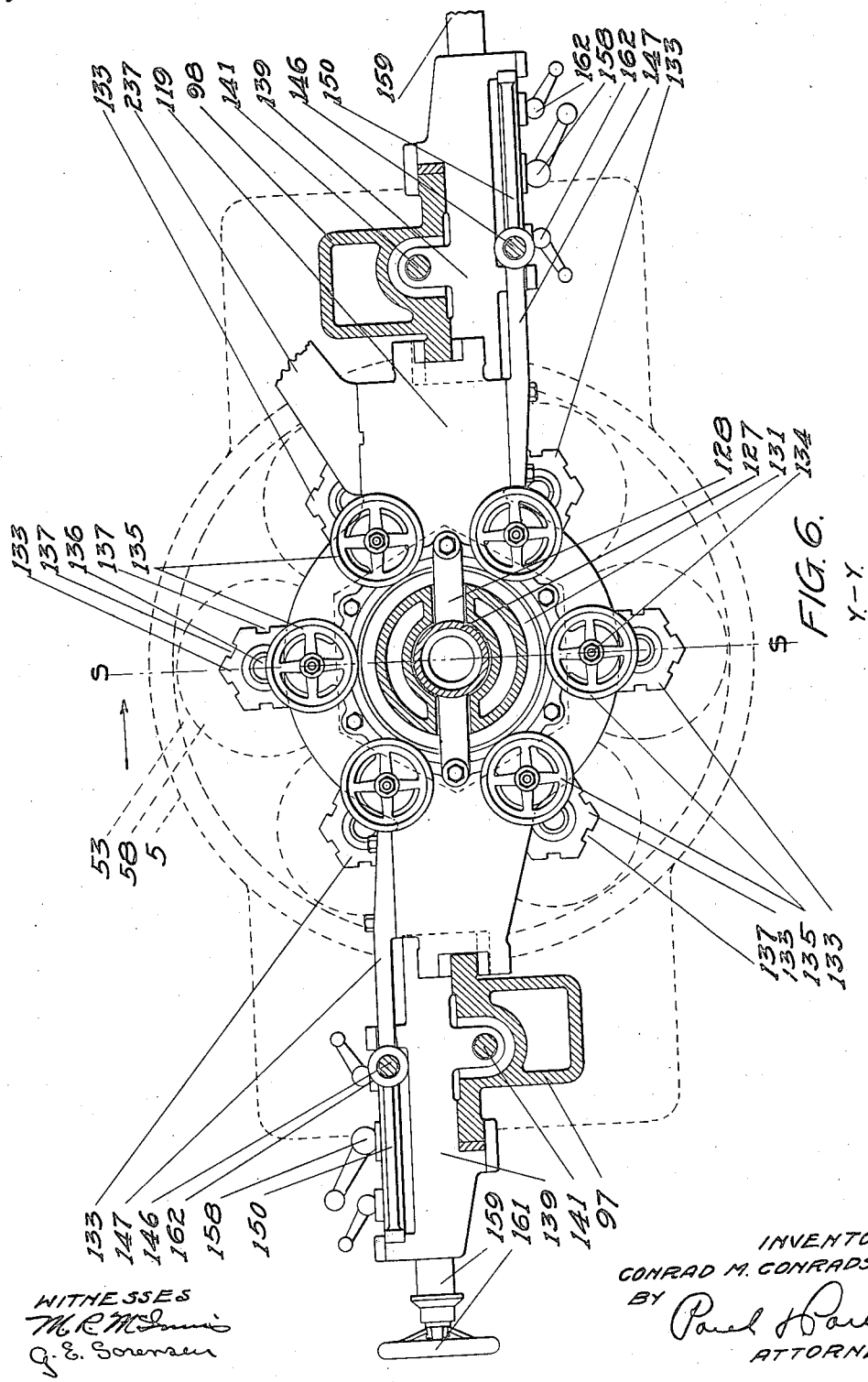

1,140,299.

Patented May 18, 1915.
17 SHEETS—SHEET 7.

Z-Z.

WITNESSES

INVENTOR
CONRAD M. CONRADSON
BY
ATTORNEYS

C. M. CONRADSON.
AUTOMATIC MULTIPLE SPINDLE LATHE.
APPLICATION FILED MAR. 30, 1914.
1,140,299.
Patented May 18, 1915.
17 SHEETS—SHEET 8.
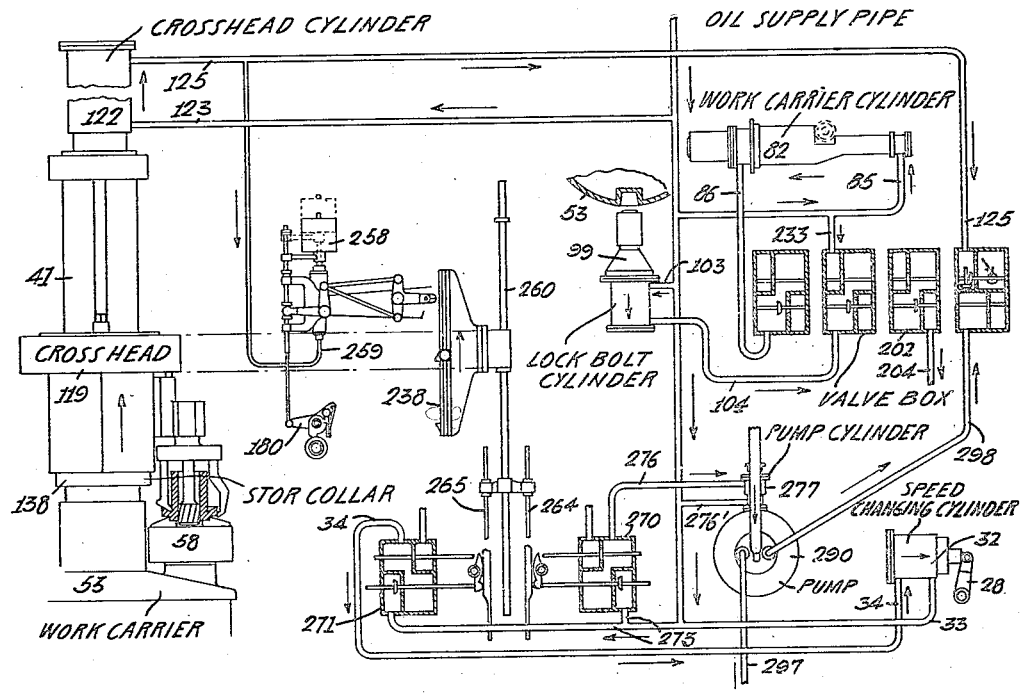
FIG. 20.
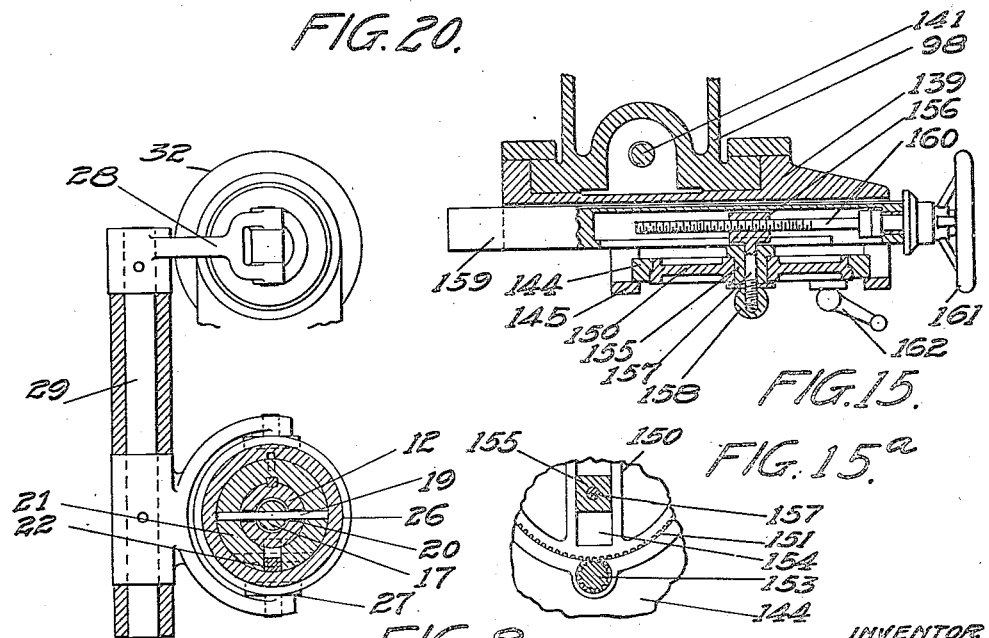
FIG. 15.
FIG. 15ᵃ
FIG. 8.
WITNESSES
INVENTOR
CONRAD M. CONRADSON
BY
ATTORNEYS C. M. CONRADSON.
AUTOMATIC MULTIPLE SPINDLE LATHE.
APPLICATION FILED MAR. 30, 1914.
1,140,299.
Patented May 18, 1915.
17 SHEETS—SHEET 9.
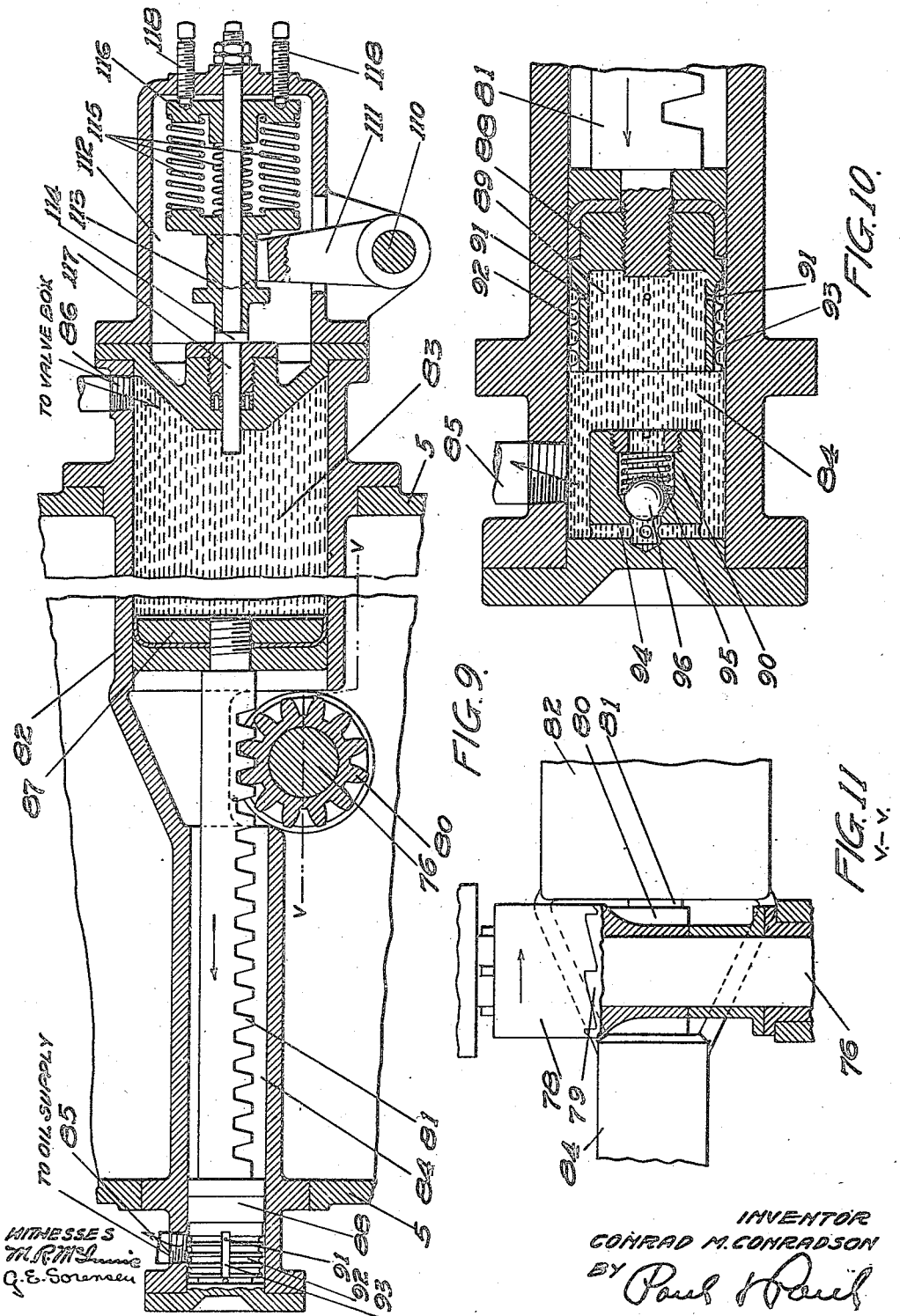
INVENTOR
CONRAD M. CONRADSON
BY
ATTORNEYS C. M. CONRADSON.
AUTOMATIC MULTIPLE SPINDLE LATHE.
APPLICATION FILED MAR. 30, 1914.

1,140,299.

Patented May 18, 1915.
17 SHEETS—SHEET 10.

WITNESSES

INVENTOR
CONRAD M. CONRADSON
BY
ATTORNEYS

C. M. CONRADSON.
AUTOMATIC MULTIPLE SPINDLE LATHE.
APPLICATION FILED MAR. 30, 1914.

1,140,299.

Patented May 18, 1915.
17 SHEETS—SHEET 12.

WITNESSES
M. R. McInnis
G. E. Sorensen

INVENTOR
CONRAD M. CONRADSON
BY Paul & Paul
ATTORNEYS

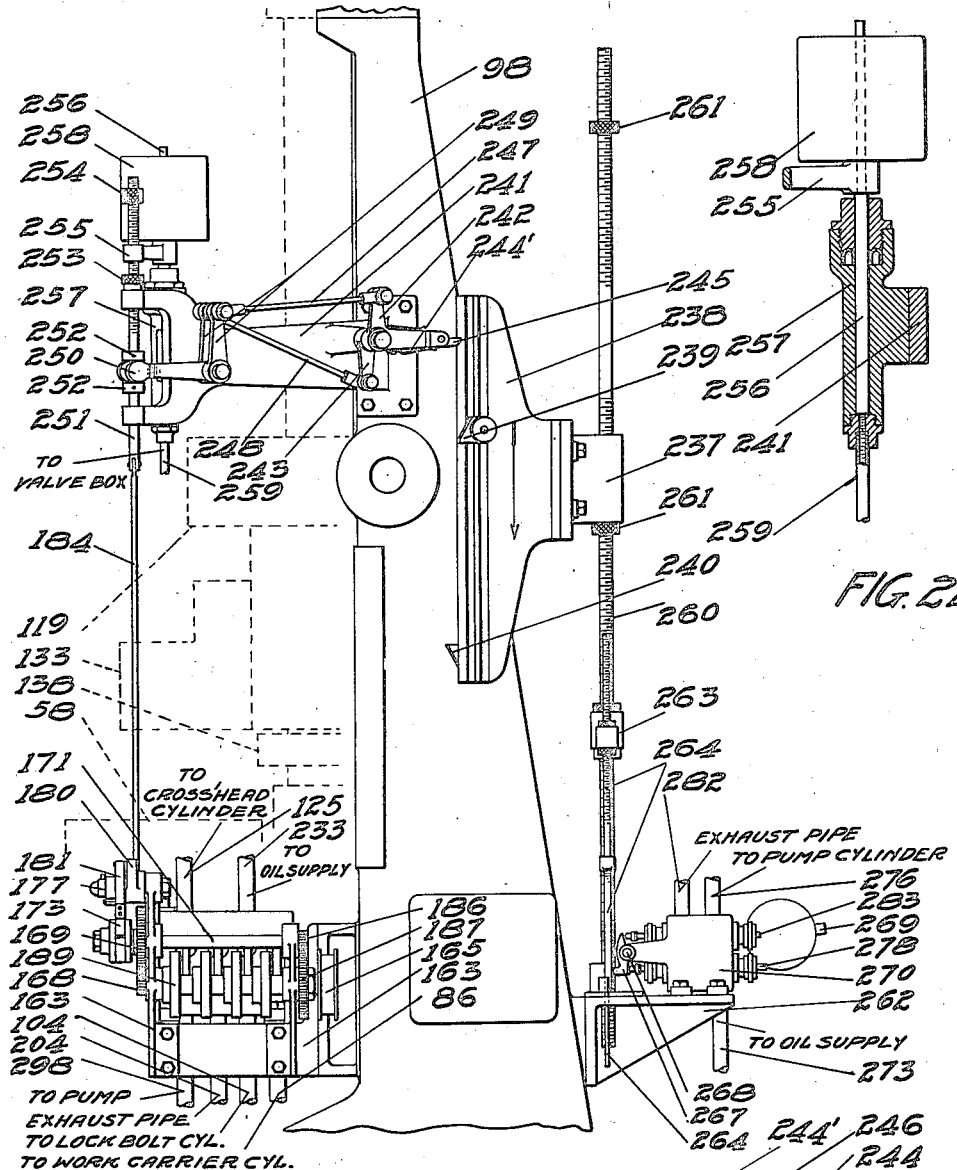
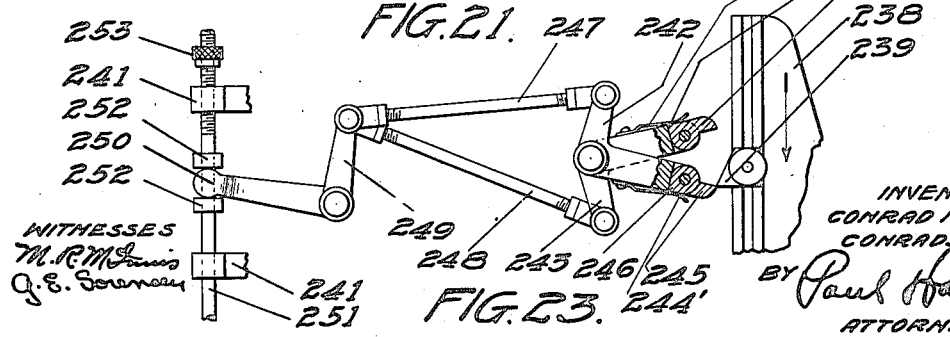

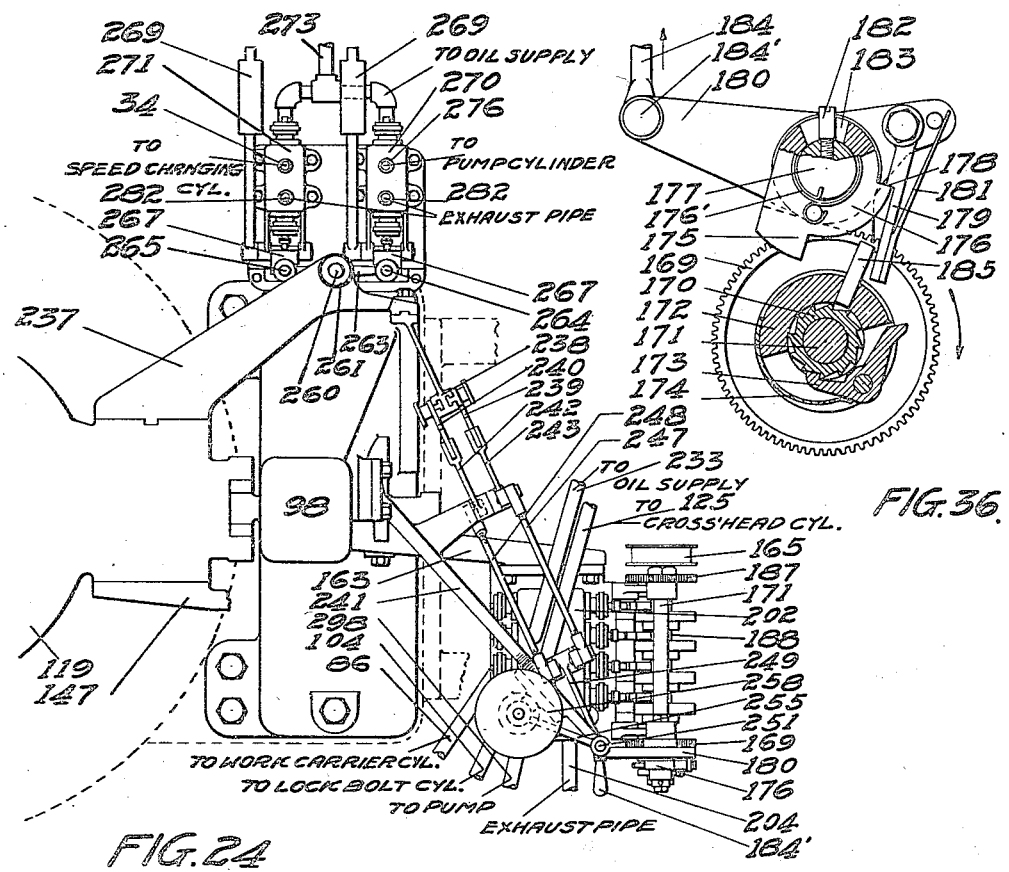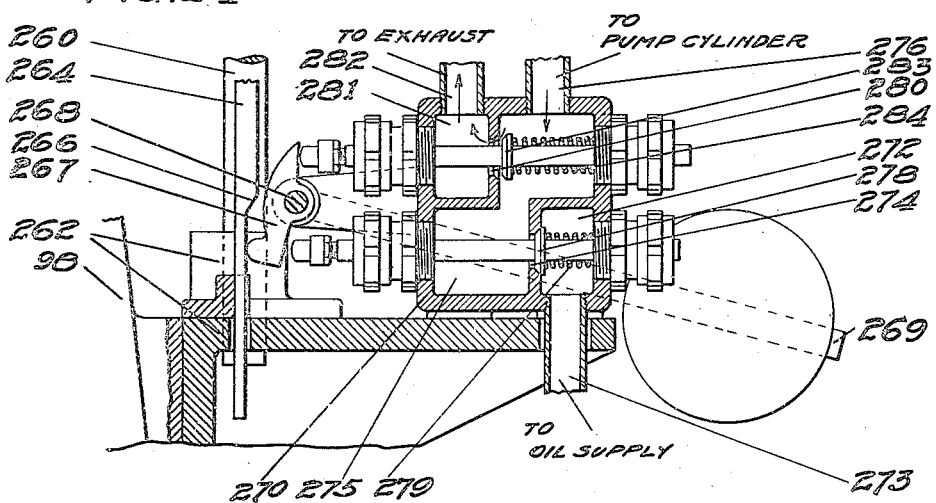

C. M. CONRADSON.
AUTOMATIC MULTIPLE SPINDLE LATHE.
APPLICATION FILED MAR. 30, 1914.

1,140,299.

Patented May 18, 1915.
17 SHEETS—SHEET 15.

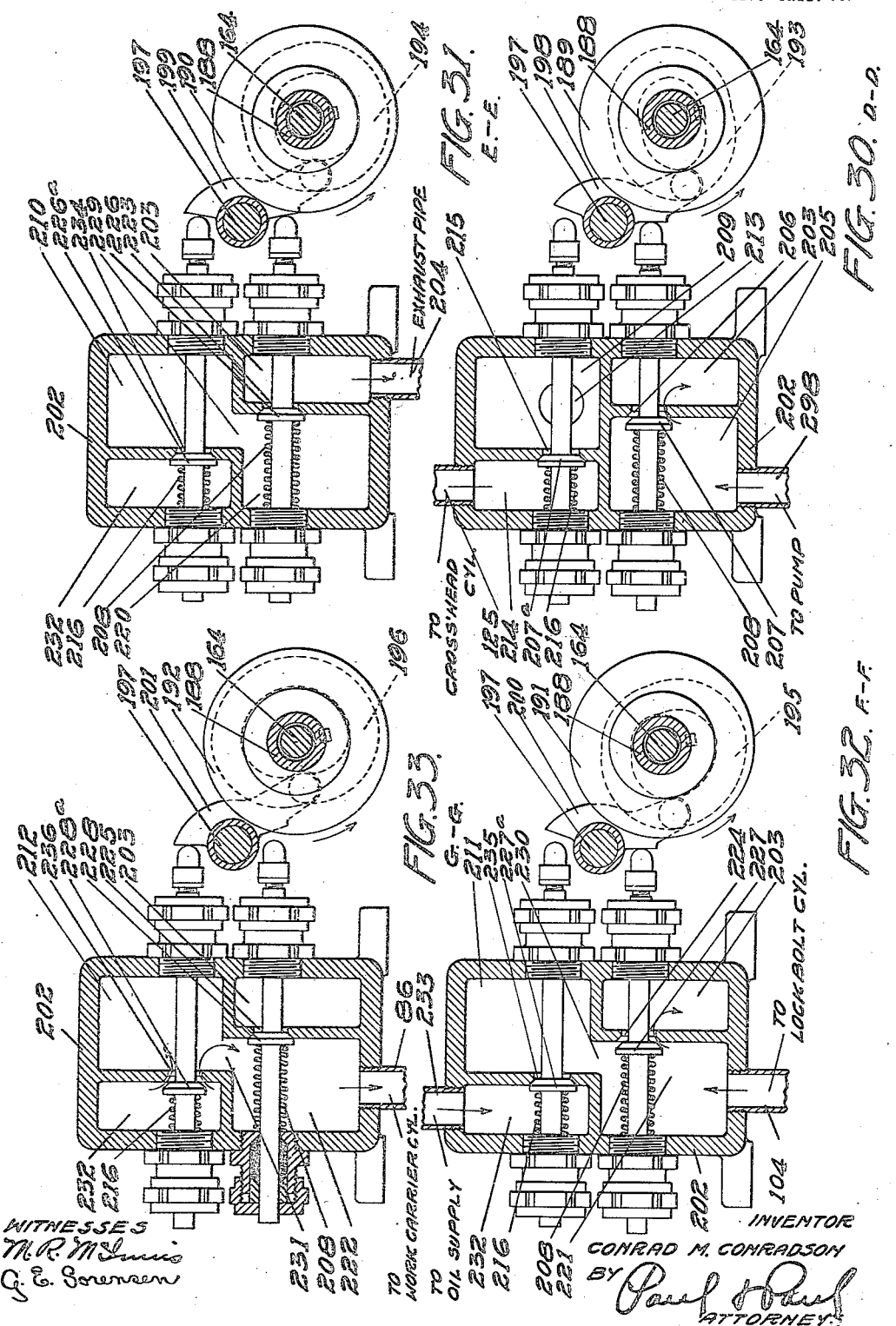

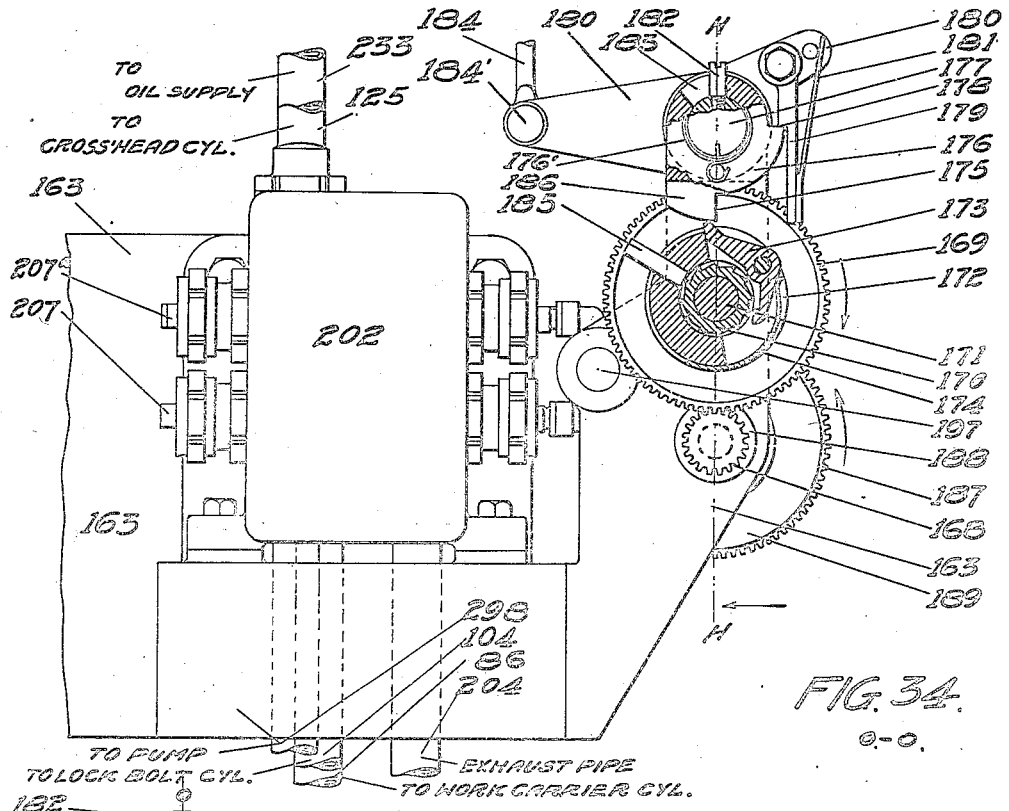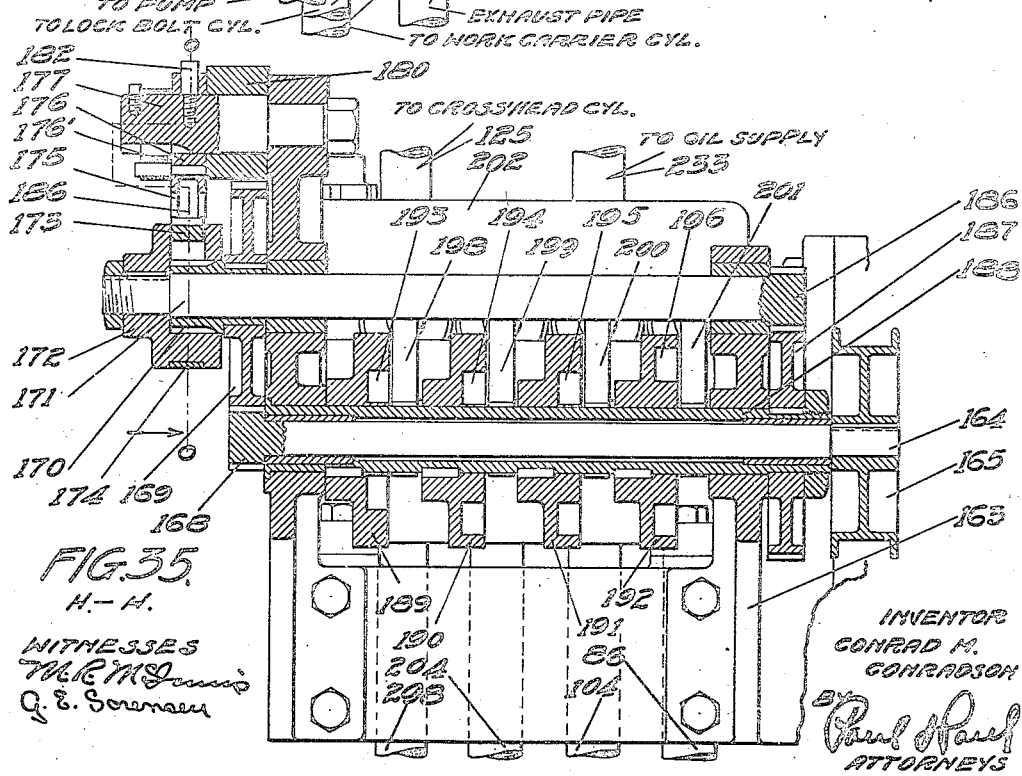

UNITED STATES PATENT OFFICE.

CONRAD M. CONRADSON, OF MADISON, WISCONSIN.

AUTOMATIC MULTIPLE-SPINDLE LATHE.

1,140,299.
Specification of Letters Patent.
Patented May 18, 1915.

Application filed March 30, 1914. Serial No. 828,369.

*To all whom it may concern:*

Be it known that I, CONRAD M. CONRADSON, citizen of the United States, resident of Madison, county of Dane, State of Wisconsin, have invented certain new and useful Improvements in Automatic Multiple-Spindle Lathes, of which the following is a specification.

The object of my invention is to provide a lathe having a large working capacity, and which, when once adjusted for a certain piece of work and set in motion, will require no attention on the part of the operator except to change the work or the tools.

A further object is to provide an automatic lathe that is capable of doing extremely fine, accurate work and capable of handling or working upon a comparatively small or large article.

A further object is to provide an automatic lathe of strong, durable construction, having all its parts readily accessible for adjustment or repairs, capable of operation at a variety of speeds, and considering the character and the amount of the work performed, of comparatively simple construction.

The invention consists generally in various constructions and combinations, all as hereinafter described and particularly pointed out in the claims.

Figure 12:
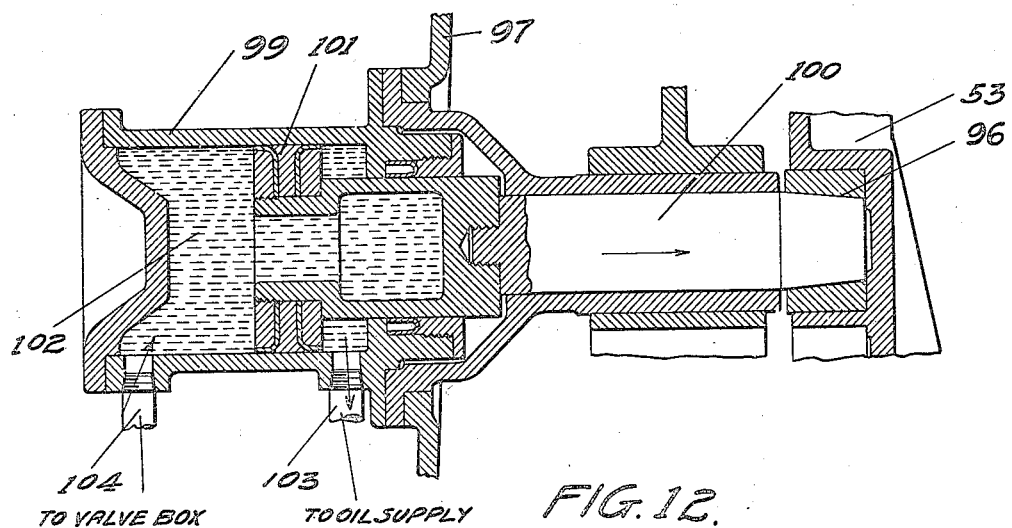
Figure 7:
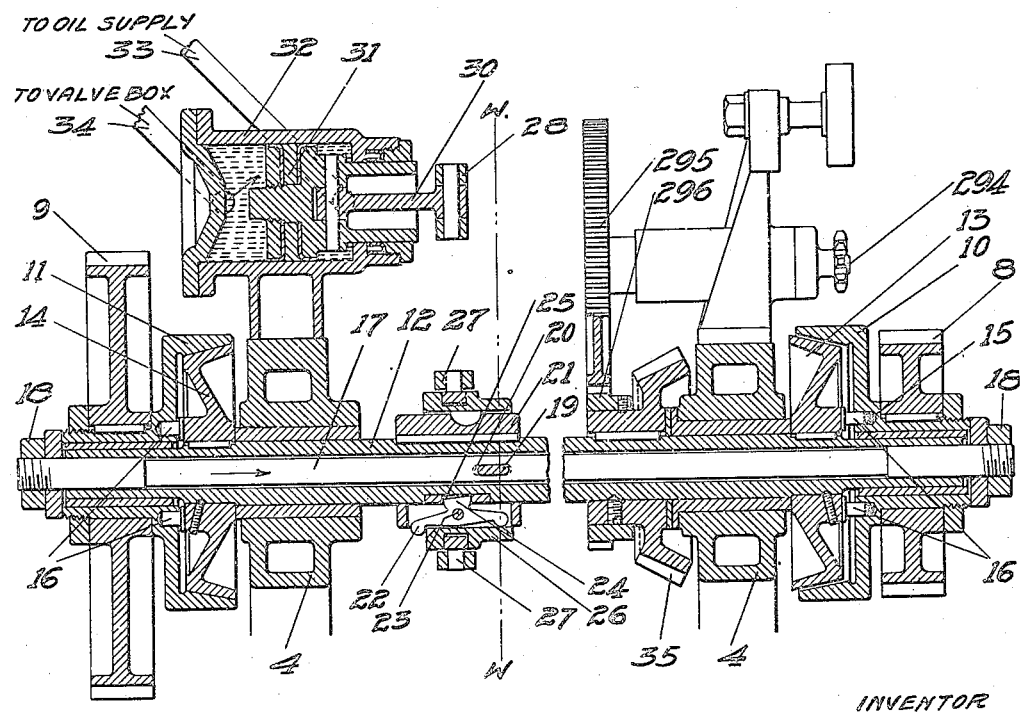
Figures 37, 38:
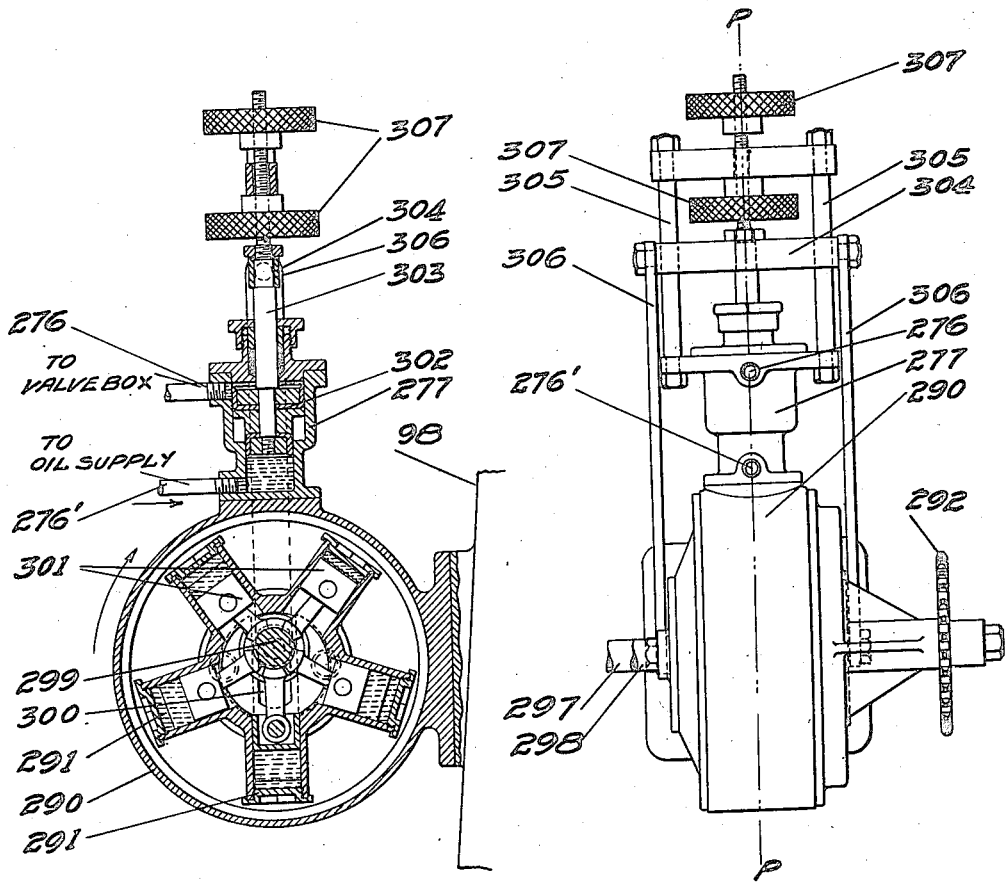
Figures 13, 14:
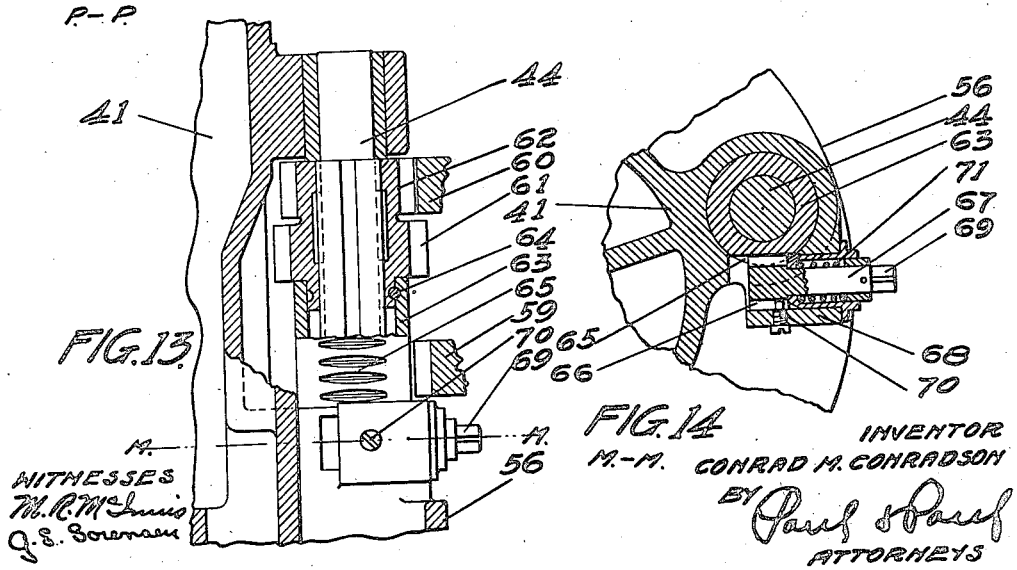
Figure 16:
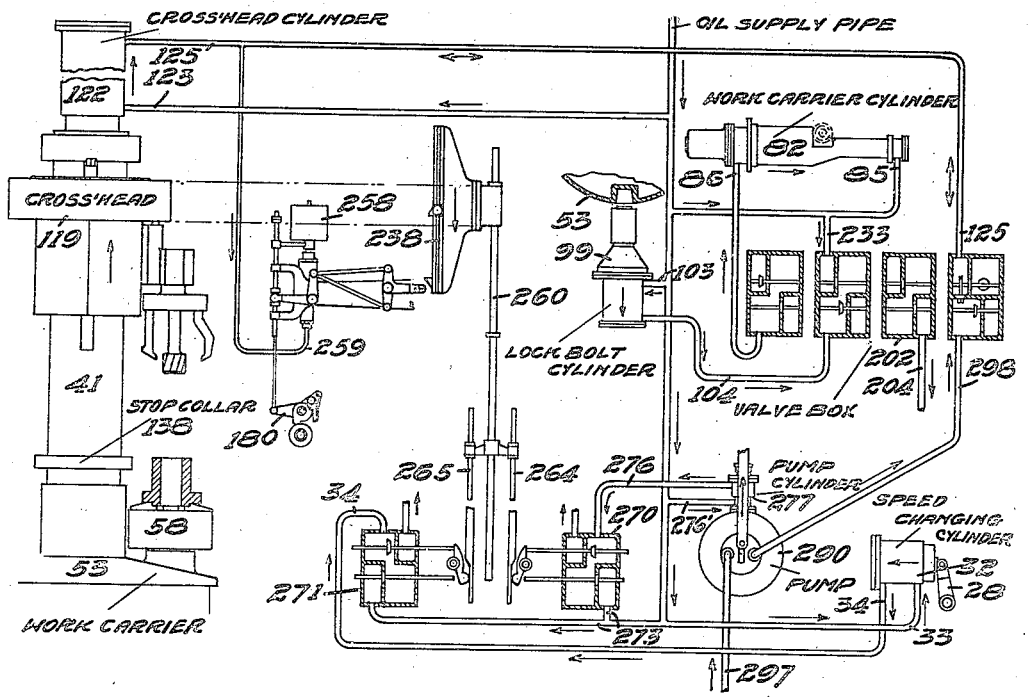
Figure 17:
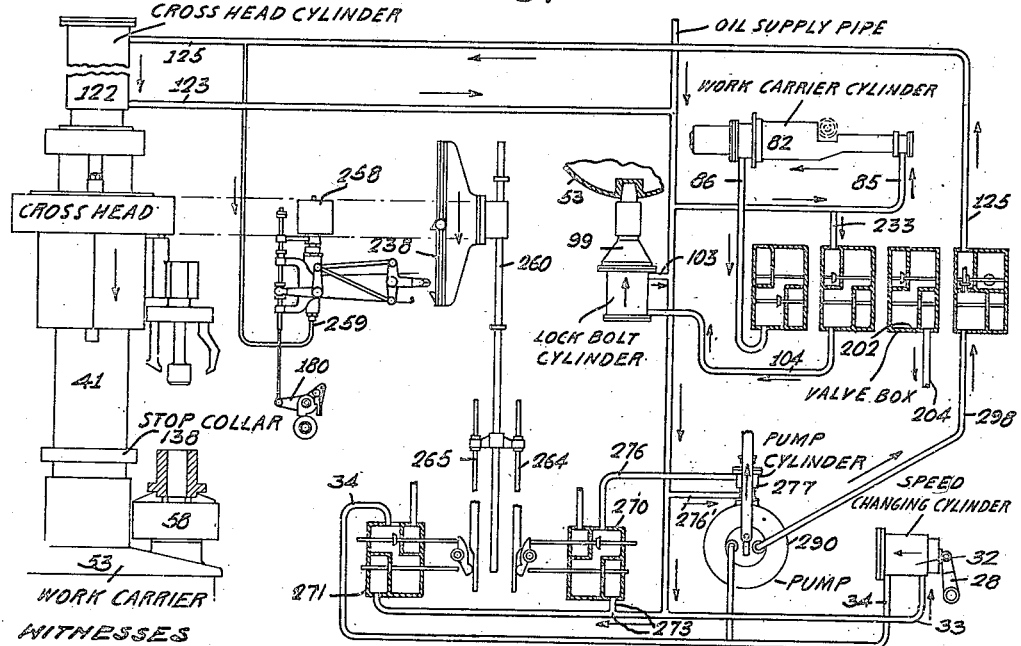
Figure 18:
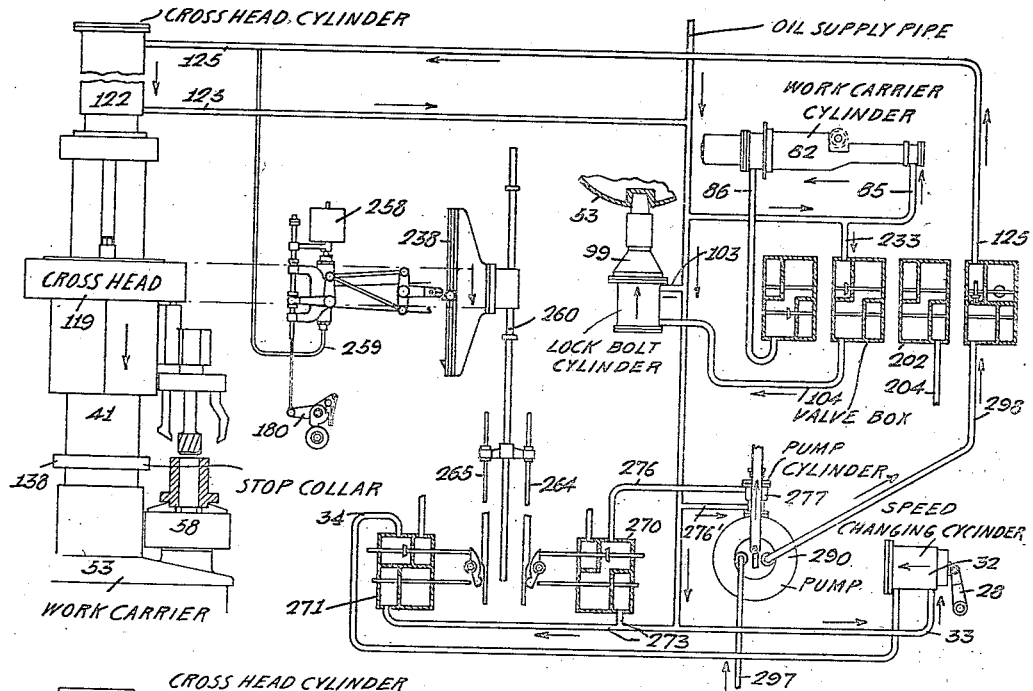
Figure 19:
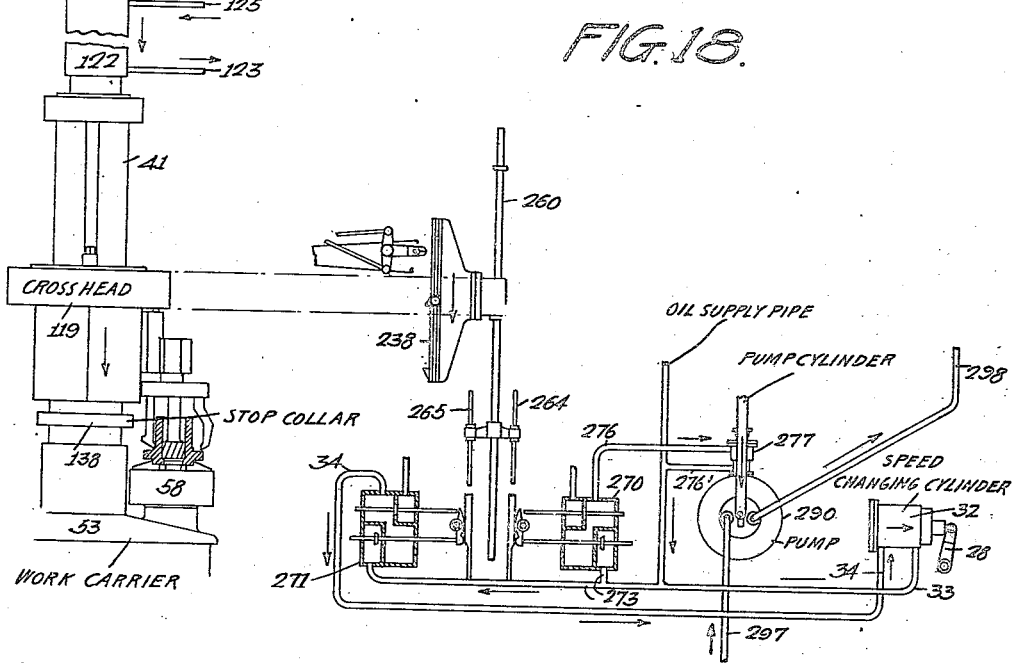

In the accompanying drawings forming part of this specification, Figure 1 is a front elevation of an automatic multiple spindle lathe embodying my invention, Fig. 2 is a vertical sectional view through the base and lower portion of the lathe, taken on the line *r—r* of Fig. 3, Fig. 3 is a horizontal sectional view on the line *x—x* of Fig. 2, Fig. 4 is a vertical sectional view through the base of the lathe, the work carrier and the tool carriage, taken on the line *s—s* of Fig. 6, Fig. 5 is a vertical sectional view through the cross head supporting the tool carriers, the upper portion of the guide of the cross head and the inelastic fluid cylinder and piston therefor at the top of the machine, Fig. 6 is a horizontal sectional view on the line *y—y* of Fig. 5, Fig. 7 is a horizontal sectional view on the line *z—z* of Fig. 2, Fig. 8 is a sectional view on the line *w—w* of Fig. 7, Fig. 9 is a sectional view, showing the means for imparting an intermittent movement to the work carrier, Fig. 10 is an enlarged detail view of the left hand end of Fig. 9, Fig. 11 is a sectional view on the line *v—v* of Fig. 9, Fig. 12 is a sectional view, showing the means for operating the work carrier lock bolt, Fig. 13 is a detail sectional view, showing the mechanism for shifting the gears to change the speed of the chucks, Fig. 14 is a sectional view on the line *m—m* of Fig. 13, Fig. 15 is a detail sectional view, showing the means for adjusting and feeding the tool carrier at the side of the machine, Fig. 15ª is a detail sectional view, showing the means for adjusting the rotating disk, Fig. 16 is a diagrammatic view, illustrating the various parts of the machine in their normal, non-working position, Fig. 17 is a similar view, showing the parts when the machine is started, with the cross-head supporting the tool carrier beginning its descent toward the work, Fig. 18 is a similar view, showing the second step in the operation, with the cross head and tool carrier approaching the work, Fig. 19 is also a diagrammatic view, illustrating the tools in engagement with the work and the cross-head nearly at the limit of its stroke, Fig. 20 is a diagrammatic view, showing the position of the parts when the cross-head has reached the limit of its downward movement and is on the point of beginning its return stroke, Fig. 21 is a detail view of the tripping mechanism and the actuating device therefor, Fig. 22 is a detail view, showing the device which is actuated when the cross-head reaches the limit of its down-stroke to automatically operate a trip mechanism and reverse the movement of the cross-head, Fig. 23 is a detail view of a portion of the tripping mechanism, illustrated at the top of Fig. 21, Fig. 24 is a plan view of Fig. 21, showing the position of the valve-box on the machine and the actuating cams for the valves, Fig. 25 is a sectional view through one of the valve-boxes, Fig. 26 is an enlarged view of the valve-box and the actuating cams, Fig. 27 is a sectional view on the line C—C of Fig. 28, Fig. 28 is a sectional view on the line A—A of Fig. 27, Fig. 29 is a sectional view on the line B—B of Fig. 27, Fig. 30 is a sectional view on the line D—D of Fig. 26, Fig. 31 is a sectional view on the line E—E of Fig. 26, Fig. 32 is a sectional view on the line F—F of Fig. 26, Fig. 33 is a sectional view on the line G—G of Fig. 26, Fig. 34 is a sectional view on the line O—O of Fig. 35, of the trip mechanism, showing it in its normal locking position, Fig. 35 is a sectional view on the line H—H of Fig. 34, Fig. 36 is a detail sectional view of the trip mechanism in its released position, Fig. 37 is a front view of the hydraulic pump for operating the tool carrier cross-head, Fig. 38 is a sectional view through the pump on the line P—P of Fig. 37.

*The driving mechanism.*—In the drawings, Figs. 1, 2 and 3, 2 represents a pulley mounted on a shaft 3 to be driven from a suitable source of power, not shown. The shaft 3 has bearings in a bracket 4 that is secured to the base 5 of the machine. A gear 6 is mounted on one end of the shaft 3 and a pinion 7 on the opposite end, meshing respectively with gears 8 and 9.

Referring to Fig. 7, the gears 8 and 9 are secured o nthe hubs of clutch members 10 and 11, which have bearings on the opposite ends of a hollow shaft 12, adjacent to other clutch members 13 and 14 which are secured on said hollow shaft. The clutch members 10 and 11 have a longitudinal movement on their bearings and are normally held out of frictional engagement with the clutch members 13 and 14 by springs 15 fitting within sockets in the members 10 and 11 and engaging pins 16 carried by said members. A shaft 17 is preferably fitted within the shaft 12 and has a limited longitudinal movement therein, regulated by lock nuts 18 on the ends of the shaft. The shaft 17 is held against rotary movement in the hollow shaft. A pin 19 passes through the shaft 17 and has its ends mounted to slide in slots 20 in the hollow shaft 12. A collar 21 is preferably secured on the hollow shaft and is provided with a lever 22 centrally pivoted at 23 therein and having a lug 24 which projects into a recess 25 in the hollow shaft. A ring 26 is splined on and encircles the collar 21 and has a clutch connection at 27 with an arm 28 that is pivoted at 29 and is connected to the rod 30 of a piston 31 of an inelastic fluid cylinder 32 having bearings on the bracket 4 above and adjacent to said shafts. The cylinder 32 has pipe connections 33 and 34 with a source of inelastic fluid supply, such as oil, under suitable pressure, and with the controlling valve-box forming a circulating system, as will hereinafter appear. It is sufficient to state at this point that the movement of the piston 31 in one direction will cause the lever 22 to be rocked and force the shaft 17 a sufficient distance to release one of the clutches and lock the other, while the movement of the piston 31 in the other direction will reverse the direction of movement of the shaft 17 and reverse the position of the clutches.

A bevel gear 35 is secured on the hollow shaft 12 (see Figs. 2, 3 and 7) and meshes with a similar gear 36 on a horizontal shaft 37 having bearings in the base 5 and provided at its inner end with a pinion 38. By means of the mechanism heretofore described the shaft 37 may be operated at a variable speed.

*The chuck and operating spindles therefor.*—The pinion 38 meshes with a gear 39 that is mounted on the lower end of a vertical shaft 40 loosely mounted in the lower end of an upright, centrally-arranged column 41. (See Figs. 2 and 4). Upon the shaft 40 gears 42 and 43 are mounted, one above another, the latter gear being larger than the former one. Grouped around the shaft 40, equi-distant therefrom and from one another, are a series of vertically arranged spindles 44. I have shown six of these spindles having suitable bearings at their upper and lower ends, but do not confine myself to this number, as the construction is susceptible of modification in this respect and still be within the scope of my invention. Upon the lower portions of these spindles, opposite the gears 42 and 43, gears 45 and 46 are splined and adapted to slide vertically. A collar 47 is loosely mounted on each spindle beneath the gears 45 and 46 and forked arms 48 are mounted on shafts 49 which preferably extend horizontally through the base of the machine and have operating cranks 50 thereon and pins 51 for entering sockets 52 provided in the wall of said base. (See Figs. 1, 2 and 3). There are as many of these shafts as there are spindles, three being provided on the front of the base and three at the rear thereof, and each shaft is capable of three adjustments, as indicated in Fig. 1, one socket or depression indicating the adjustment for one gear and speed, another socket for another gear and speed, and the intermediate socket for the neutral position, or when both gears 45 and 46 are out of mesh with the gears 42 and 43 and the spindle is stationary. With the mechanism so far described, the operator is able to revolve the shaft 37 at different speeds and impart a variable speed to the shaft 40, and may also operate the upright spindles at two different speeds, and may operate all of them at the same time or any number of them, as desired. These driving or chuck-operating spindles, it will be understood from the foregoing, have a revolution on their axes independently of one another, but do not revolve with the work carrier.

*The work carrier.*—Referring to Figs. 1, 2 and 4, 53 represents the revolving work carrier, preferably of a circular, turret-like form, surmounting the base 5 and seated at 54 thereon. The work carrier also has a long bearing surface at 55 on the column 41 and is preferably provided with a bearing surface at 56, thereby insuring the uniform and accurate revolution of the work carrier around the central support. In this work carrier there are mounted a series of chuck spindles 57, preferably hollow, to allow the metal shavings to drop down through them from the chucks 58 mounted on the upper ends of the spindles. There are, in this machine, six spindles and six chucks, corresponding in number to the spindles 44 and arranged opposite and adjacent thereto. Each chuck spindle is preferably provided with gears 59 and 60 secured thereon and adapted to mesh with pinions 61 and 62 splined on the adjacent spindle 44. These gears and pinions vary in size to enable the operator to adjust them for revolving the chucks and spindles at different speeds. Each chuck and its spindle is preferably operable independently of all the other chucks and their spindles and consequently one or more of them may be operated at one speed while the others are operated at another speed, at the same time. The pinions 61 and 62 may be raised or lowered by any suitable means, but I prefer to provide a sleeve 63 on each spindle 44, having at its upper end a pin and groove connection at 64 with the hub on which the pinions are mounted, and provided in its outer surface with a series of rack teeth 65 which are engaged by a pinion 66 on a short shaft 67 that is suitably mounted in a socket 68 adjacent to said sleeve and provided with a squared end 69 for an operating tool. A stop 70 normally engages the teeth of the pinion 66 and locks it against revolution and supports the pinions 61 and 62 in their adjusted position, and a spring 71 normally holds the shaft 67 and the pinion in position to engage said stop. Endwise pressure on said shaft will force it inwardly to disengage the pinion from the stop and allow the shaft to be revolved to raise or lower the sleeve and adjust the pinions in engagement with their gears respectively or move them to a neutral position between the gears when the operator desires the chuck to be stationary. (See Figs. 4, 13 and 14.) The wall of the work carrier 53 is provided with openings 72, (see Figs. 1 and 4) through which the operator may have access to the shaft 67. These adjustments, when once made for a certain class of work, will be undisturbed generally, the variation in speed of the chucks being effected by the speed changing mechanism heretofore described.

The chuck spindles, as indicated in Fig. 4, are preferably provided with tapered sleeve bearings 73 and 74 for convenience of adjustment to take up wear. The lower portion of the work carrier is provided with an annular gear ring 75. (See Figs. 1, 2 and 4.)

For the convenience of the operator, the operating or driving spindle at the front of the machine is allowed to remain stationary, and as the chuck spindles pass from driving engagement with one driving spindle to another, it follows that each chuck spindle, when in the station or period at the front of the machine, will be stationary on its axis, giving the operator time to remove the piece of work in the chuck or re-adjust it, or substitute another piece of work therefor.

*The work carrier operating mechanism.*— Referring to Fig. 2, 76 is an upright shaft mounted in bearings in the base of the machine and provided at its upper end with a pinion 77 which meshes with the gear ring 75. A ratchet clutch member 78 is splined on the shaft 76 and free to slide vertically thereon, and a second ratchet member 79 is loosely mounted on said shaft below the member 78 and has a toothed face 80 to engage the teeth of a rack bar 81 that is mounted to slide in a differential cylinder 82. (See Figs. 9, 10, and 11.) The cylinder 82 is provided with a comparatively large inelastic fluid chamber 83 and a smaller inelastic fluid chamber 84, the latter connecting through a pipe 85 with the source of inelastic fluid supply, (not shown) and the former communicating through a pipe 86 with the controlling valve-box, as will be more fully described hereinafter. A piston 87 is mounted on the bar 81 within the chamber 83 and a smaller piston 88 is mounted on the opposite end of the bar 81 within the chamber 84. When the valve is open in the valve-box to allow the inelastic fluid to flow into the chamber 83, the piston 87 will be forced toward the position indicated in Fig. 9, the teeth of the rack bar engaging the teeth of the clutch member 79 will, through its engagement with the teeth of the clutch member 78, revolve the shaft 76 and through the pinion 77 and the gear ring 75, revolve the work carrier. The clutch member 78 will remain by gravity in engagement with the teeth of the clutch member 79 as long as the clutch member 79 is operated in one direction, but on the back stroke of the rack bar the teeth of the lower clutch member will slip past the teeth of the upper clutch member, allowing the shaft 76 to remain stationary while the rack bar returns to its normal position to begin another stroke. The work carrier therefore revolves with a step by step or intermittent movement, there being a series of such movements during the complete revolution of the work carrier, with a comparatively short stationary or rest period between the movements. The operating mechanism for the carrier is so proportioned and the movements are so timed that there will be six complete movements or strokes of the carrier with each revolution, corresponding in number to the chucks and spindles. Thus if the operator places a piece of work in the chuck nearest the front of the machine and starts the carrier, there will be six successive steps or strokes of the carrier before the chuck returns to the starting point, and during this time, the work may be operated upon by various tools, as will later be more fully described.

Referring to Fig. 10, the piston 88 is provided with a chamber 89, which coöperates with a head 90 provided in the end of the chamber 84 to form a dash-pot to check the movement of the piston as it approaches the end of the cylinder. The walls of the chamber 89 have ports 91 therein through which the inelastic fluid may escape into the chamber 84, and the outer surfaces of the walls of said chamber have a series of annular grooves 92 and longitudinal grooves 93 intersecting said annular grooves. These grooves are for the purpose of allowing the inelastic fluid to flow slowly into the chamber 84, thereby checking the momentum of the work table. The head 90 is preferably provided with ports 94 communicating with a passage 95 running through said head and normally closed by a spring-actuated ball valve 96. These passages and the valve allow the inelastic fluid to flow in behind the piston to actuate it for its return stroke.

*The work carrier lock and stop mechanism.*—It is evident that where the work carrier has a series of intermittent strokes that some means should be provided for locking it against premature movement during the stationary or rest period, when the tools are at work, or while the operator is changing the speed of some of the parts or removing work from a chuck or placing it thereon. I therefore preferably provide the wall of the carrier with a series of sockets 96, corresponding in number to the stops made by the carrier with each revolution, and located for convenience intermediate to the chucks and spindles. (See Figs. 2 and 3). Upon each side of the column 41 I provide upright standards 97 and 98, and upon the former I mount a cylinder 99 (see Figs. 2 and 12). A bolt 100 has a tapered end adapted to enter a socket 96 and be seated snugly therein and positively lock the work carrier against rotary movement in either direction during the stationary period between its stroke. The bolt 100 is connected to a piston 101 that is slidable within an inelastic fluid chamber 102 in the cylinder 99, and said chamber has pipe connections 103 and 104 with a source of inelastic fluid supply and a valve-box controlling the flow of fluid to said cylinder chamber, and whereby the bolt 100 will be alternately projected and retracted to lock the carrier and release it.

In addition to the positive lock device for the work carrier, I prefer to provide a stop which will operate to positively check the movement of the carrier when a socket 96 is in position to receive the locking bolt 100.

With this end in view I provide a pin 105 in the work carrier, under each socket 96, said pin having a notched outer end 106 which projects outwardly beyond the face of the carrier. A bolt 107 is preferably mounted to slide in the wall of the column 97 beneath and adjacent to the lock bolt 100 and is provided with a notched inner end adapted, when the bolt is projected, to engage the notched end 106 of one of the pins 105 and positively stop the carrier against further movement. (See Figs. 2 and 3.) A lever 108 is pivoted at a point intermediate to its ends in the standard 97 and has a loose pivotal connection at one end with a bolt 107 and at its opposite end it has a similar connection with an arm 109 that is mounted on an upright shaft 110. A similar arm 111 is carried by the shaft 110 and projects into a casing 112 that is mounted on the outer end of the cylinder 82 and has a forked end to straddle a hub 113 that is mounted on a rod 114 within said casing. One end of said rod preferably has a bearing in the end of said casing and the opposite end projects into the inelastic fluid chamber 83 in the path of the piston 87. A series of springs 115 are interposed between a head 116 and the hub 113 and normally tend to hold the said hub with a yielding pressure against a collar 117 on said rod. Adjusting screws 118 permit the tension of said spring to be regulated. The forked end of the arm 111 straddles the hub 113 to be rocked with the longitudinal movement of said hub on the rod 114. (See Figs. 3 and 9). In the position shown in these figures, the carrier is stationary, being at rest between strokes, or at one of the six stations or stops included in each complete revolution of the carrier. The stop bolt 107 is therefore projected and has engaged a stop pin 105 to check the movement of the carrier.

*The cross head and tool carrier.*—Referring to Figs. 1, 4 and 5, 119 represents a cross head mounted to slide vertically on the central column 41 and the standards 97 and 98. A bar 120 connects the upper ends of the standards with one another and supports an inelastic fluid cylinder 121 having a chamber 122 therein. This chamber has a pipe connection 123 with a source of inelastic fluid supply, under pressure, and also has a pipe connection 125 with a valve-box or timer controlling the admission of fluid to the cylinder. A differential piston 126 is preferably provided in said chamber and a pipe 127, forming a piston rod, is connected at one end to said piston and at its other end to a bar 128 that is secured by bolts 129 to the cross-head 119. A carrier 130 is also secured to said cross-head, preferably by the said bolts 129, said sleeve having tapered bearing rings 131 at each end on the column 41. The carrier 130 is preferably hexagonal in cross section, as indicated by dotted lines in Fig. 6, and each of these hexagonal faces is provided with vertical grooves 132 in which tool holders 133 are vertically slidable and capable of vertical adjustment independently of one another by means of screws 134 mounted in the cross-head and having operating wheels 135. (See Figs. 1, 4 and 6.) The tool holders are each preferably provided with a central socket 136 and with a series of peripheral grooves 137 in which tools of varying lengths and sizes may be mounted. A stop collar 138 is mounted on the column 41 adjacent to the chucks, and forms a positive stop to limit the downward stroke of the cross head and the tool carriers and insure great accuracy in the work of the tools and the operation of the machine. This stop collar is capable of adjustment on the column 41, as indicated in Figs. 1 and 4.

*The horizontal feed side carriers.*—Referring to Figs. 1 and 5, 139 is a carrier vertically movable on the upright standard 98. A screw 141 is mounted in the standard 98 and is geared to a shaft 142 having a hand wheel 143. When the shaft 142 is revolved, the carrier 139 may be raised or lowered, as desired, to set it at proper height with respect to the chucks 58. The standard 97 is equipped with a similar slide operated in the same manner, and which I will designate by the same reference numeral.

Referring now to Figs. 1, 15, and 15a, 144 is a slide, vertically movable in guides 145 on the carrier 139. A screw 146 is pivotally connected with the slide 144 and fits loosely within a hole in an arm 147 that is secured to the cross head 119. Stop nuts 148 and 149 are mounted on the screw 146 and adjustable thereon for regulating their point of contact with the arm 147 and the time of movement of the slide 144. A disk 150 is mounted to rotate in the slide 144 and is provided with an adjusting means, such as rack teeth 151 and a lever 152 having a pinion 153 for engaging the teeth 151 and rotating the disk 150 for the purpose of changing the angle of the transverse slot 154 therein with respect to the horizontal. A block 155 is slidable in the slot 154 and a hub 156 is mounted in the rear of the slide 150 and has a stud 157 projecting through the block 155 and tapped into the lever 158. By means of this lever the block 155 may be locked in any desired position in the slot 154. A horizontal tool holder 159 is mounted in the carrier 139 in the rear of the disk 150, and a screw 160, having an operating wheel 161, is mounted in said holder and tapped into the hub 156. The disk 150 is locked at any desired point in its revolution, by suitable means, such as the levers 162. The hub 156 engaging the threads of the screw 160, will cause the tool holder to be moved back and forth, toward or from the work when the screw is revolved. The feed of the tools is determined by the adjustment of the disk 150, the block 155 sliding freely in the slot 154 during the vertical movement of the slide 144. Evidently, if the disk be adjusted so that the slot 154 is vertical, there will be no feed whatever of the tools, while the rotation of the disk 150 and the tilting of the slot 154 will feed the tool holder, the degree of feed depending upon the angle of inclination of the slot. The proper time to start the tool holder 159 toward the chucks is timed by means of the collars 149 on the shaft 146 of the slide 144. The opposite side of the machine is equipped in a similar manner, the mechanism being preferably arranged on the rear of the standard 97 where it would not be visible in the figures. It will be understood, however, that there is a tool holder and carrier with lateral feed on both sides of the work carrier, the tools operating horizontally with respect to the work, and raised and lowered by the movement of the cross-head.

I have now described the mechanism for operating the work carrier and spindles, the devices for locking the carrier temporarily at each station, the speed-changing mechanism for the spindles, to be used when necessary, the tool carriers, and the manner of projecting and retracting them, and I will now proceed to describe in detail the means for automatically controlling or timing the successive operations of these mechanisms and for varying the speed and feed of the parts, when desirable, in a complete cycle of operations of the machine, it being understood that the operation of the various parts will be properly synchronized and continuous when the machine is started by the operator.

*The trip mechanism.*—Referring to Fig. 1, 163 is a bracket, secured to the standard 98. 164 is a shaft, mounted in the bracket 163 and having a pulley 165 connected by a driving belt 166 to a pulley 167 on the shaft 3. (See Figs. 1, 3 and 35). The shaft 164 has a pinion 168 thereon meshing with a gear 169 that is secured on the hub of a ratchet wheel 170 that is loosely mounted on a shaft 171 and operated continuously from the shaft 164. The shaft 171 is parallel with the shaft 164 and adjacent thereto and is provided with a hub 172 secured thereon and inclosing the ratchet wheel 170. (See Fig. 35). A pawl 173 is pivoted in the hub 172 and adapted to engage the teeth of the ratchet wheel 170 and temporarily lock the hub and ratchet wheel together to revolve the shaft 171. A spring 174 bears on the dog 173 to force it into engagement with the ratchet teeth. One end of the pawl 173 preferably projects outwardly beyond the periphery of the hub 172 into the path of a lug 175 provided on a disk 176 that is loosely mounted on a stud 177 and provided with a shoulder 178 that is held in engagement with a similar shoulder on a dog 179 carried by an arm 180 and yieldingly held toward said disk by a spring 181. A pin 182 is mounted in the stud 177 and preferably projects into a slot 183 in the disk 176 for the purpose of limiting its stroke. The arm 180 is loosely mounted on the stud 177 and is pivotally connected to a trip rod 184 on the opposite side of the stud 177 from the pivotal connection of the dog 179 with said arm. The arm 180 is preferably provided with an operating handle 184'. A pin 185 is mounted in the hub 172 to revolve therewith and is adapted to pass through a slot 186 in the lug 175. The lower end of the dog 179 will, when the arm 180 is tilted, be moved into the path of the pin 185. (See Figs. 34, 35 and 36). When the operator swings the arm 180 and the trip rod upwardly, the disk 176 will be rotated against the tension of the spring 176' thereon and the lug 175 will be moved out of engagement with the pawl 173, whereupon the pawl will be swung into engagement with the ratchet teeth and the hub 172 and the shaft 171 will be picked up and revolved by said ratchet. Soon after the starting of the hub the pin 185 will engage the dog 179 and push it out of engagement with the shoulder 178 (see Fig. 36) whereupon the disk spring 176' will return the disk to its normal position and the pawl 173, upon completing its revolution, will strike the lug 175 and be disengaged from the teeth of the ratchet, and the shaft 171 will be stopped until the trip arm is again actuated.

*The valve operating mechanism.*—The shaft 171 is preferably provided with a pinion 186 which meshes with a gear 187 secured to a hollow shaft 188 having bearings in the bracket 163. The pinion 186 and the gear 187 are in the ratio of four to one; that is, the gear 187 revolves one quarter of a revolution to one revolution of the pinion 186. On the shaft 188 I secure a series of disks 189, 190, 191, and 192. These disks are provided respectively with cam tracks 193, 194, 195 and 196. (See Figs. 30 to 33 inclusive and 35). A shaft 197 is preferably mounted parallel with the shaft 164 and a series of levers 198, 199, 200 and 201 have hubs loosely mounted on the shaft 197 and project at one end respectively into the cam tracks above described so that with the revolution of the disks the levers will be oscillated on their supports.

*The valve box and the valves, or controlling device.*—Referring to Fig. 1, 202 is a valve-box, carried by the bracket 163 and in which the valves regulating and controlling the flow of the inelastic fluid to the various operating cylinders are preferably arranged, with the exception of the valves for regulating the flow of fluid to the speed-changing cylinder and the pump cylinder, these latter valves being embodied in a mechanism mounted at the rear of the machine and not shown in Fig. 1, but appearing in the plan view of Fig. 24. The valves embodied in the box 202 are illustrated in Figs. 26 to 33 inclusive and to these figures the description will now be directed. The box 202 is provided with an exhaust chamber 203 extending preferably from end to end thereof and having an exhaust pipe connection 204 through which the inelastic fluid may be conducted back to the source of supply. The valve-box is also provided with a chamber 205, communicating with the exhaust chamber through a port 206 that is normally closed by a valve 207 that is mounted in the walls of the box and projects into the path of the lever 198 on one side of its pivot to be actuated by the movement of said lever in one direction when the disk cam 189 is operated. A spring 208 normally holds the valve 207 in its closed position. Above the exhaust chamber 203 I prefer to provide a series of chambers 209, 210, 211 and 212, the chamber 209 communicating with the chamber 210 by means of a port 213. Above the chamber 205 is a chamber 214 with which the pipe 125 of the cross-head actuating cylinder is connected. A port 215 leads from the chamber 214 to the chamber 209, and a valve 207$^a$ normally closes the port 215 and has a stem projecting into the path of the lever 198 on the opposite side of its pivot from the valve stem 207. A spring 216 normally holds the valve 207$^a$ in its closed position. The chamber 214 also communicates with the chamber 205 through a port 217 that is normally closed by a valve 218 actuated by a spring 219. This valve is adapted to open to relieve the pressure in the chamber 205. The lower portion of the box is preferably provided with a series of chambers 220, 221, and 222, having ports 223, 224, and 225 communicating with the exhaust chamber 203, (see Fig. 29), and valves 226, 227 and 228 are mounted in the walls of said box to close said ports respectively and normally held in a closed position by springs corresponding to the actuating springs for the valve 207 and which I will indicate by the same reference numeral. The stems of these valves are on a level with the stem of the valve 207 and project into the path of the levers 199, 200 and 201 on the underside of their pivots, (see Figs. 31 to 33 inclusive) to be actuated by said levers to open the ports leading to the exhaust chamber as the cam disks are revolved. The chambers 220, 221 and 222 are separated from one another and from the chamber 205, as indicated in Figs. 29 to 33 inclusive. The pipe 86 from the work carrier cylinder communicates with the chamber 222 and the pipe 104 from the lock bolt cylinder communicates with the chamber 221. The chambers 220, 221 and 222 communicate respectively with the chambers 210, 211 and 212 through ports 229, 230 and 231 provided in the floor of the chambers 210, 211 and 212. In the upper part of the valve-box is a chamber 232 running lengthwise thereof and having a pipe connection at 233 with the inelastic fluid supply. (See Fig. 32). This chamber communicates through ports 234, 235 and 236 with the chambers 210, 211 and 212 respectively, and valves 226ª, 227ª, and 228ª are mounted to close these ports and are normally held in their closed position by springs corresponding to the one on the valve 207ª and which I will designate by the same reference numeral. The stems of the valves 226ª, 227ª, and 228ª project into the path respectively of the levers 199, 200, and 201 above their pivotal support, (see Figs. 30 to 33 inclusive) said valves being actuated against the tension of their springs by the rocking of said levers in one direction when actuated by the revolution of the cam disks. Through these valves the inelastic fluid entering the chamber 232 through the pipe 233 will flow into the chambers 210, 211 and 212 respectively, as the valves are opened, and from thence into the chambers 220, 221 and 222, and from the chambers 221 and 222 to the lock bolt and work carrier cylinders, as will be hereinafter more particularly described in the explanation of the machine.

*Mechanism for operating the trip device through the movement of the cross-head.—* Referring to Figs. 21 to 24, 237 is a bracket secured to the cross-head and supporting a carrier 238, in which dogs 239 and 240 are vertically adjustable. These dogs are alike in construction, each having a straight and a beveled edge, but are reversely arranged, in staggered relation to one another, in the face of the carrier. In one dog the beveled edge is on the upper side and in the other dog the beveled edge is on the under side. A bracket 241 is secured to the standard 98 and bell cranks 242 and 243 have a common pivot on the bracket 241 and latches 244 and 245 are pivoted on the arms of the said bell cranks adjacent to the carrier 238 and each latch is free to tilt out of alinement with its supporting arm in one direction, but is provided with a shoulder 246 for limiting its movement in the other direction. The latches lie in the path of the dogs 239 and 240 and are actuated thereby to rock the bell cranks as the carrier 238 descends or ascends in the movement of the cross-head, and the pivoted arrangement of the latches allows one to be operated upon the descent of the carrier and the other to be operated on the ascent of the carrier. The bell cranks 242 and 243 are preferably connected by links 247 and 248 with a bell crank 249 having a fork 250 on one arm to straddle a rod 251 between collars 252, whereby rocking of the bell crank 249 will operate to raise the rod or allow it to fall. This rod is movable in guides in the bracket 241 and has a threaded upper portion provided with nuts 253 and 254. Between these nuts is an arm 255 to which a rod 256 is attached and vertically movable in a socket 257 provided in the bracket 241. A weight 258 is carried by the rod 256. The lower end of the socket 257 has a pipe connection 259 with the pipe 125 leading to the valve-box 202. The lower end of the rod 251 is pivotally connected to the upper end of the rod 184 that is attached to the arm 180 of the trip mechanism. The weight above referred to is actuated through its hydraulic pipe connections when there is an accumulated pressure in the cross-head cylinder resulting from the positive stopping of the tool carrier by its engagement with the stop collar, and this accumulated pressure has the effect of lifting the weight and operating the trip mechanism to shift the valves controlling the flow of fluid to the cross head cylinder and reverse the carrier. Normally, the pressure in the cross-head cylinder will be insufficient to raise this weight.

The above described tripping mechanism has reference particularly to the valve control for the cross-head cylinder, the lock bolt cylinder, and the work carrier cylinder. I will now describe the tripping mechanism relating particularly to the speed changing cylinder and the feed pump cylinder.

Referring to Figs. 21 and 25, 260 is a rod, loosely mounted in the bracket 237 and projecting above and below the same and having nuts 261 adjustable on said rod upon opposite sides of said bracket. The lower end of said rod is preferably guided in a bracket 262 and is slidable therein. A cross bar 263 is vertically adjustable on said rod and in this cross bar actuating bars 264 and 265 are mounted, flat preferably in cross section at their lower ends and each having a shoulder 266, (see Fig. 25) in position to engage one end of a lever 267 mounted on shafts 268 that are provided with weighted arms 269. Adjacent to the levers 267 are valve boxes 270 and 271. The former has a chamber 272 communicating through a pipe 273 with the inelastic fluid supply. A port 274 connects the chamber 272 with a chamber 275 which has a pipe connection 276 with a pump cylinder 277. (See Figs. 37 and 38). A valve 278 normally closes the ports 274, preferably by the pressure of a spring 279 and the stem of said valve projects into the path of the lever 267 on the lower side of its pivot, to be actuated thereby when the lever 267 is engaged by the shoulder 266. The port 280 connects the chamber 275 with a chamber 281, from which an exhaust pipe 282 leads to the source of inelastic fluid or to any other suitable point. A valve 283, actuated by a spring 284, normally closes the port 280 and its stem projects into the path of the lever 267 above its pivot and is normally held in its open position by the weighted arm 269. The box 271 is identical to the box 270 with the exception of having its chamber 275 communicating through the pipe 34 with one end of the speed changing cylinder 32. The period of operation of the levers 267 will depend, of course, on the position of the stop nuts 261 on the rod 260. Generally the adjustment will be made to change the speed of the chuck spindles and the pump, where the diameter of the work or the nature of the cut changes.

*The feed pump and operating mechanism therefor.*—Referring to Figs. 2, 37 and 38, 290 represents the casing of an inelastic fluid centrifugal pump, having revolving cylinders 291 driven through a sprocket wheel 292 and a belt 293 from the shaft 294, which in turn is driven through the gear 295 and the pinion 296 from the bevel gear 35, (see Figs. 2 and 7). The casing of the pump has inlet and outlet inelastic fluid pipes 297 and 298. A shaft 299 is mounted to slide laterally in a slot 300 in said casing and has bearings for the connecting rods of pistons 301 in said cylinders 291. The cylinder 277 has a piston 302 therein, provided with a rod 303. A bar 304 is preferably carried by said rod and is adapted to slide on the side bars of a frame 305 and is connected at each end by straps 306 with the ends of the shaft 299. The frame 305 is mounted at one end on the cylinder 277 and the rod 303 has a threaded upper end which projects through the corresponding end of the frame 305 and has stop nuts 307 thereon by means of which the rod 303 and its piston can be adjusted in the cylinder to obtain the desired stroke and movement of the shaft 299 under the action of the inelastic fluid in the cylinder. This is for the purpose of changing the speed of the pump at different points in the stroke of the cross-head. The pump will have, therefore, a variable speed and an adjustable stroke.

The speed changing cylinder and the pump for changing the speed of the feed and the work during the cut are adjuncts or devices auxiliary to the main features of the machine. In some classes of work, it will be unnecessary to change the feed of the tools or the speed of revolution of the work and at such times the devices for effecting these changes in speed may be renderd inoperative, while the other parts of the machine will operate as before. It will be understood, therefore, that while the means for changing the feed of the tools and the speed of the work during the cut are important under certain conditions in the operation of the machine, they will not be called into service except when the character of the work makes it desirable.

*The operation of the lathe.*—The shafts 37 and 40 will, as heretofore stated, be operated continuously. The operator, standing in front of the machine, will place the work in the chucks during the stationary period of each chuck spindle or while it is opposite the stationary driving spindle at the front of the machine, as heretofore explained, duplicate pieces of work being placed in the chucks to be successively operated on by suitable tools in the different holders during the periodical stops of the work carrier at the stations. A number of tools may be placed in each holder, as, for instance, a centrally arranged drill with cutting tools of different shapes and sizes arranged around it. The feed of these tools will be regulated by the time required for the one having the longest cut. As each chuck completes its revolution around the central column of the machine, the operator may remove the work, if completed, and substitute another piece therefor, and as each chuck and its spindle is operated independently of all the other chucks and at a different speed, if desired, six corresponding pieces of work may be operated upon at the same time with several tools working on each piece in each chuck, or five pieces if one driving spindle is stationary. In the normal position of the machine, the cross-head will be raised to a point where the tools are clear of the work and may be inserted in the holders or removed therefrom conveniently.

There are four steps or movements in the operation of the machine, operating *seriatim* and properly synchronized by the controlling device. First, the trip mechanism is operated by hand, or other suitable means, to start the cross-head and tools toward the work, which, as heretofore described, may be operating at different speeds. The initial movement of the cross-head is preferably a rapid one, being the idle part of its stroke and hence it is desirable to economize as much as possible in the time required for moving the tools to their working position.

The initial movement of the cross head is preferably effected by the connection of the cross head cylinder with the inelastic fluid supply under suitable pressure. The valves of the controlling or timing device are shifted from the normal position shown in Fig. 16 to that illustrated in Fig. 17 by the movement of the trip, actuated manually or by a suitable means when it is desired to start the machine, the operation of the trip releasing the stop motion, which changes the position of the valves, admitting fluid pressure to the cross head cylinder for the purpose of starting the tool carrier on its downward movement. The descent of the carrier 238 will move the dog 240 past the latch 245 without tripping it and the downward travel of the carrier will continue until the parts reach the position where the dog 239 will engage the latch 245 and release the stop motion a second time to again shift the valves of the timing device to the position indicated in Fig. 18. The tool carrier will now have approached to a point near the work. By this shift of the valves the auxiliary power device or pump 290, which has been operating continuously but through the exhaust, will be brought into action to direct the fluid through the pipes 298 and 125, and the valve chamber connected therewith to the cross head cylinder to positively feed the tool carrier in the cutting part of its stroke.

In case it is desired to vary the speed of the tool carrier and the work carrying spindles, the bars 264 and 265 are adjusted to actuate the shifting mechanism and change the valves in the boxes 270 and 271, whereupon the oil will be admitted through the pipe 276 to the cylinder 297 and the piston therein will be depressed to move the axes of the pump pistons nearer the center and reduce the speed and thereby the feed of the tool carrier will be correspondingly reduced. At the same time, if desired, the valves in the box 271 may be shifted to admit the fluid pressure to the speed changing cylinder of the work-carrying spindles and shift the driving gears thereof and temporarily reduce the speed of the spindles. Of course it will be understood that the speed of the pump need not be reduced unless desired, nor need the speed of the work-carrying spindles be changed. These features of the machine may be active or inactive, as desired, according to the character of the work to be performed. With the piece of work shown in the chuck in the diagrammatic views, it would be desirable to change the speed of the tools and the work, and the rods 264 and 265 are therefore shown in position where the pump and speed-changing cylinder will be affected by the change of the valves in the boxes 270 and 271 at a predetermined point in the descent of the tool carrier. When the tool carrier comes in contact with the stop collar its downward movement will be positively arrested, and the cross head cylinder, being under fluid pressure, there will be an accumulation or excess of pressure resulting from the sudden stopping of the carrier sufficient to lift the weight 258 and operate the trip mechanism to again release the stop motion and reverse the flow of the fluid pressure in the cross head cylinder and start the tool carrier on its return movement. The position of the valves controlling the flow of fluid pressure is indicated in Fig. 20, the carrier having engaged the stop and the weight having been lifted by the accumulation of pressure in the system. The tool carrier will then begin its return or upward movement, but no change in the mechanism will take place until the dog 240 engages the latch 245 and again actuates the trip mechanism and releases the stop motion. The valves of the timer controlling the flow of the fluid with the lock bolt cylinder will be operated to withdraw the lock bolt and the valves controlling the flow of the fluid to the work carrier cylinder will also be operated to cause the work carrier cylinder piston to be actuated and revolve the work carrier one step, and in this case one-sixth of its revolution, and the stop bolt will be projected into the path of a pin on the carrier to positively stop it when it reaches the end of its step. The machine will then have completed its cycle of operation and the parts will be in the position illustrated in Fig. 16, ready to begin another operation when the trip device is actuated.

From the foregoing it will be noted that the descent of the tool carrier may be positively checked at a predetermined point, thereby insuring great accuracy in the work of the tools, and it is also possible, when desired, to change the speed of the work and the tools, as occasion may require. Upon being released, the tool carrier begins its downward movement and the revolving work carrier is locked by the movement of the lock bolt cylinder piston, as indicated in Fig. 17. The next operation cuts in the pump to positively feed the tool carrier; then, if desired, the speed of the pump is reduced to reduce the feed of the tools and the speed of the work-carrying spindles may also be changed if it seems desirable. Then, when the tool carrier reaches the limit of its downward movement, another operation takes place automatically and the return travel of the tool carrier begins and at a predetermined point in the upstroke of the tool carrier the last or final operation is performed to release the work carrier, shift it a step and return the parts to their normal position.

In Figs. 16 to 20 I have illustrated in a diagrammatic way the successive steps in the automatic operation of the machine.

Fig. 16 shows the normal position of the parts before the trip mechanism is operated manually, the lock bolt being withdrawn, its cylinder being connected with the exhaust of the valve box, the work carrier cylinder piston having completed its stroke and released the stop bolt to check the movement of the work carrier.

In Fig. 17 the parts are shown in the position assumed during the initial movement of the cross-head. The inelastic fluid is flowing from the chamber 214 and supply pipe to the upper end of the cross-head cylinder to actuate the piston and lower the cross-head. At the same time the exhaust of the lock bolt cylinder is closed and the bolt projected to lock the work carrier, and the work carrier cylinder is opened to the exhaust. A comparison of the sectional views of the valve-box in the diagrammatic views with the sections of Figs. 30 to 33 inclusive will indicate the relative location of the exhaust and inlet valves. At this point the exhaust of the pump in the chamber 205 will be closed and the relief valve 218 will open to allow the inelastic fluid to be forced through the chamber 214 and the pipe 125 to the cross-head cylinder to accelerate the movement of the cross-head and tool carrier. Communication will also be established through the ports 215, 213 and 234 with the pipe from the source of inelastic fluid supply.

In Fig. 18 the parts are shown in the position assumed immediately following the second operation of the trip through the agency of the upper dog on the carrier 238. When this trip takes place, the valve 226$^a$ will be allowed to close, cutting off the flow of fluid from the supply to the chamber 214 and allowing the flow from the pump to continue directly through the said chamber 214 to the upper end of the cross-head cylinder for the purpose of insuring a positive uniform movement of the cross-head during the working part of its stroke. The valves for the work carrier cylinder and lock bolt cylinder will remain undisturbed in the same position as in Fig. 17.

In Fig. 19 that portion of the mechanism is illustrated which is affected by the movement of the trip device 260 and the bars 264 and 265. By the movement of these bars, the levers 267 are actuated to open the valves 278 and admit inelastic fluid from the source of supply to depress the pump shaft piston in the cylinder 270 and reduce the speed of the pump and at the same time, through the valve 271, actuate the speed-changing cylinder piston to shift the clutches on the shaft 12, (see Fig. 7) and change the speed of the chuck spindles. This is for the purpose of compensating for the difference in diameter of the work on which the tools may be operating. This is plainly illustrated in Fig. 19, where one tool is indicated as finishing a cut on the surface of smaller area, while another tool is operating or about to operate upon a surface of greater area, or one tool at this point may be taking a heavier cut than those taken by the other tools and in consequence the speed of the machine should be temporarily reduced. The desired cutting speed depends upon the diameter of the work and the nature of the cut, and this feature of the machine, as heretofore explained, will not at all times be necessary, but whenever desired, the operator can, by a simple adjustment, utilize this feature.

In Fig. 20 the cross head is shown at the end of its downward stroke, seated squarely on the stop collar and positively arrested thereby, the tools having completed their cut and ready for the return stroke of the cross-head. The stopping of the cross-head will result in creating an increased pressure in the upper end of the cross-head cylinder and this is relieved through the pipe 259 and results in lifting the rod 256 and the weight 258 to the position indicated by dotted lines in Fig. 20 and again tripping or releasing the valve-actuating mechanism through the connection of the rod 256 with the rod 184. This operation of the trip mechanism will open the exhaust valve 227 of the lock bolt cylinder and allow the inelastic fluid to retract the lock bolt, as indicated in Fig. 20, the inlet valve 227$^a$ for said cylinder being temporarily allowed to close. At the same time, the valve 207$^a$ will be opened to release the inelastic fluid in the top of the cross-head cylinder and allow the piston therein to be raised for the return stroke of the cross-head and tool carrier. As the dog 240 moves upward with the carrier 238, it will operate the trip mechanism a fourth time when the cross-head is near the limit of its up-stroke, and the parts will then be returned to the position indicated in Fig. 16, the exhaust of the pump being opened, the lock bolt remaining in its retracted position, while the valves controlling the work carrier cylinder are shifted to close the exhaust and open the inlet valve and actuate the work carrier cylinder piston and rotate the work carrier another step.

The fluid pressure circulating system and its pipe connections with the hydraulically controlled devices for operating the carriers and spindles may be compared to the circuit of an electric lighting system, where the lamps are connected in parallel, or where the circuit may be directed through one lamp or a group of lamps without passing through the other lamps. The circulating pipes of this machine correspond to the electric conductors. The various cylinders and pistons for operating or controlling the operation of the work-carrier, the tool carrier, the locking device and for varying the speed of the spindles and the travel of the tool carrier, correspond in this system to the lamps of a lighting system and have pipe connections with the fluid pressure circulating system similar to the connections of the lamps arranged in parallel in the lighting system in that the oil or other inelastic fluid may flow to one or more of the cylinders and pistons in this machine without flowing to, or passing through, the other cylinders and pistons connected in a similar manner with the same system. This flow of the inelastic fluid is regulated or controlled by the valve box, which corresponds in this system in its function to the switch of a lighting system. The inelastic fluid circulating system has supply and exhaust pipes corresponding to the feed and return wires of the lighting system. Where, in the claims, the expression "in parallel circuit" is used, it will be understood to mean that the pipe connections of the circulating system, with the cylinders and pistons for actuating the carriers and controlling the different mechanisms, are so arranged that the inelastic fluid may flow to one or more cylinders independently of the others, depending upon the position of the valves of the timing device.

The term "inelastic fluid" as used herein is intended to cover any suitable fluid, such as oil or water, and the terms "hydraulic" or "hydraulically operated" are intended to refer to and embrace devices using any such inelastic fluid.

In various ways the details of construction herein shown and described may be modified and still be within the scope and spirit of my invention.

I claim as my invention:

1. In a multiple spindle lathe, a revolving carrier having a step by step movement, a plurality of revolving driving spindles having a stationary support, a plurality of work-holding spindles mounted in said carrier to revolve therewith and encircling said driving spindles and geared thereto to be revolved thereby, means for operating said spindles at variable speeds, and a tool carrier having a reciprocating movement toward and from said work-holding spindles, and tool holders mounted in said tool carrier to register respectively with said work-holding spindles.

2. In a multiple spindle lathe, a plurality of driving spindles having a stationary support, a revolving work carrier having a step by step movement around said spindles, a plurality of work-holding spindles mounted in said carrier at a uniform distance from the axis thereof and from one another, said driving spindles having gearing whereby one or more of them may be stationary and all the others driven simultaneously, said work-carrying spindles being geared to and encircling said driving spindles to be revolved successively thereby only during the stationary or intermediate periods between the steps of said work carrier, the stationary period of each work-carrying spindle, when opposite the stationary driving spindle, permitting the convenient mounting or removal of the work, and a reciprocating tool carrier having tool holders supported opposite and registering with said work-carrying spindles.

3. The combination, with a revolving carrier having an intermittent movement, of a central driving gear, a plurality of work-carrying spindles mounted in said carrier and having gears thereon, a corresponding number of driving spindles mounted in fixed bearings between said central gear and said work-carrying spindles and having gears meshing continuously with said central driving gear and intermittently with said work-carrying spindle gears in the revolution of said carrier.

4. The combination, with a revolving carrier having an intermittent movement, of a central driving gear, a plurality of driving spindles having a stationary support and variable speed driving connections with said central driving gear, a corresponding number of work-carrying spindles mounted in said carrier to revolve therewith around said driving spindles, gears for said work-carrying spindles, variable speed driving connections between said driving spindles and said work-carrying spindles for operating the latter during the stationary periods of said carrier, the gears of said work-carrying spindles moving out of engagement with the gears of said driving spindles during the revolving movement of said carrier.

5. The combination, with a revolving carrier having an intermittent movement, of a central driving gear, a plurality of driving spindles mounted in fixed bearings and uniformly spaced apart around said central driving gear, a plurality of work-carrying spindles mounted in said carrier to revolve therewith, gears of different sizes for said work-carrying spindles and gears of different sizes for said driving spindles mounted to mesh with said central driving gear and with the gears of said work-carrying spindles for operating any one of said work-carrying spindles or any group of said spindles at the same or variable speeds, or allowing any one of said work-carrying spindles or any group of said spindles to remain stationary during the revolution of said carrier, said work-carrying spindles passing out of driving connection with said driving spindles and being stationary on their own axes during the movement of said carrier.

6. The combination, with a revolving carrier having an intermittent movement, of a central driving gear, driving spindles, work-carrying spindles having a stationary support mounted in said carrier, gears of different sizes mounted on said work-carrying spindles, transmission gears of different sizes slidably mounted on said driving spindles to mesh with said central driving gear and with the gears of said work-carrying spindles for revolving any one or any group of said driving spindles and said work-carrying spindles independently of the other spindles at the same or different speeds, or allowing one work-carrying spindle or one group of such spindles to remain stationary on their axes during the revolution of said carrier.

7. A multiple spindle lathe comprising a revolving work-carrier having a plurality of chucking positions or stations, a central driving gear, a plurality of driving spindles having a stationary support and driving connections with said central driving gear, a corresponding number of work-supporting spindles geared to said driving spindles and mounted in said carrier to revolve therewith around said driving spindles and on their own axes, means causing said work-carrying spindles to be out of driving connection with the driving spindles between chucking positions, and means causing each work-carrying spindle to be temporarily stationary on its axis in a predetermined chucking position and to revolve on its axis in other chucking positions.

8. The combination, with a plurality of work-carrying spindles and means for revolving them on their axes, of means for varying the speed of a spindle or group of spindles independently of the other spindles, and a hydraulic circulating system having means for varying the speed of the spindles simultaneously.

9. In a lathe, a plurality of work-supporting spindles, a driving means geared to said spindles, each spindle being mounted to revolve on its axis independently of the other spindles and a hydraulic circulating system having means for varying the speed of the spindles simultaneously.

10. The combination, with a plurality of work-carrying spindles and means for varying the speed of revolution of said spindles on their axes independently of one another, of a hydraulic circulating system having means for varying the speed of the spindles simultaneously.

11. The combination, of a plurality of work-carrying spindles, a hydraulic circulating system having means for driving the spindles simultaneously at variable speeds and manually controlled means for operating any spindle at the same or different speeds from the other spindles.

12. In combination, with a plurality of work-carrying spindles and a driving means therefor, of a fluid circulating system having means for varying the speed of all the spindles simultaneously.

13. In a lathe, a revolving work carrier having an intermittent movement, a plurality of work-supporting spindles mounted therein, a hydraulic circulating system having means for operating said work carrier, a driving means for said work-carrying spindles, said circulating system having means connected with the driving means of said spindles for automatically varying the speed thereof.

14. The combination, with a central driving gear, of a plurality of work-carrying spindles mounted to revolve around said driving gear and also having a revolving movement on their axis, driving spindles having variable speed driving connections with said central driving gear and with said work-carrying spindles, and a hydraulic device for automatically changing the speed of revolution of said work-carrying spindles at a predetermined point.

15. The combination, with a base and upright standards mounted thereon, and a cross bar connecting the top of said standards, of a revolving work carrier on said base between said standards, a column concentric with said work carrier on said base and having its upper portion supported in said cross bar, and a tool carrier slidable vertically on said column and having guides on said standards.

16. In a lathe, a base, a column mounted thereon, a work carrier supported on said base, standards projecting upwardly from said base, a cross bar connecting said standards with said column, and a tool carrier movable on said column between said standards.

17. In a lathe, a base, upright guides thereon, a work carrier mounted to revolve on said base between said guides, a tool carrier vertically slidable between said guides, and a fluid pressure cylinder and piston disposed between said guides and connected with said tool carrier.

18. The combination, with a base and upright guides thereon and a cross bar connecting the upper portions of said guides, of a carrier mounted to revolve on said base between said guides, a tool carrier slidable between said guides, a fluid pressure cylinder mounted on said cross bar, and a piston therefor connected with said tool carrier.

19. The combination, with a base and upright guides thereon, of a cross-head vertically slidable between said guides, a carrier supported by said cross-head, a guide for said carrier, said carrier having a plurality of outer faces, and tool holders vertically adjustable in said faces.

20. The combination, with the upright guides, of a reciprocating cross-head, a bar secured thereto, a fluid pressure cylinder having a piston connected with said bar, and a carrier secured to said bar and tool holders mounted on said carrier.

21. In a multiple spindle lathe, a base, upright standards mounted thereon, an upright column, a work carrier mounted to revolve on said base concentrically with said column, a bar connecting the upper portions of said standards and wherein the upper portion of said column is supported, a crosshead having guides on said standards to reciprocate thereon, and a tool carrier carried by said crosshead.

22. In a lathe, a base, upright standards mounted thereon, an upright column positioned between said standards, a work carrier mounted to revolve on said base concentric with said column, a tool carrier slidably mounted on said column and having guides on said standards, and a fluid pressure cylinder and piston forming an upward extension of said column and connected with said tool carrier.

23. In a lathe, a base, upright standards mounted thereon, a work-carrier mounted to revolve on said base between said standards, a central column around which said carrier revolves, a stool carrier mounted to slide on said column between said standards, and lateral feed tool carriers having guides on said standards upon each side of said work carrier.

24. The combination, with a base and upright standards, of a work carrier mounted to revolve upon said base between said standards, a tool carrier vertically slidable between said standards and having guides thereon, and a lateral feed tool carrier having a guide on one of said standards connected with said first named tool carrier for simultaneous movement therewith.

25. The combination, with a base and upright standards mounted thereon, of a revolving work carrier positioned on said base between said standards, a tool carrier having a cross bar slidable in guides on said standards, lateral feed tool carriers having guides on said standards and connected with said crosshead for vertical movement therewith.

26. The combination, with a base, and upright standards mounted thereon, of a carrier mounted to revolve upon said base between said standards, an upright column concentric with said carrier and around which column said carrier revolves, a crosshead having guides in said standards and vertically slidable on said column, a tool carrier mounted on said crosshead and tool carriers having a lateral feed mounted in guides on said standards.

27. The combination, with a base, and upright standards thereon and a centrally arranged upright column between said standards, of a work carrier mounted to revolve on said base concentric with said column and provided with a plurality of work-carrying spindles, a tool carrier mounted to slide vertically on said column, and lateral feed tool carriers having vertical guides on said standards.

28. The combination, with a base, of a revolving carrier mounted thereon, a plurality of spindles mounted in said carrier, a driving mechanism therefor, said spindles having a change speed gearing including gears of different sizes slidably mounted, shafts mounted in said base and operatively connected with said sliding gears, each of said shafts having an operating handle whereby the change gears of any spindle can be shifted independently of the corresponding gears of the other spindles.

29. The combination, with a revolving work carrier, of a reciprocating tool carrier, a central guide column for said reciprocating tool carrier and a normally stationary stop on said column in the path of said tool carrier for positively limiting the movement thereof toward said work carrier.

30. The combination, with a revolving work carrier operating in a horizontal plane, of a vertically reciprocating tool carrier, a tool holder supported thereby, a guide column for said reciprocating tool carrier, and a stop on said column in the path of said tool carrier for positively limiting the movement thereof toward said work carrier.

31. The combination, with a base and an upright column thereon, of a carrier mounted to revolve on said base concentric with said column, a plurality of work-carrying spindles mounted in said carrier to revolve therewith, a tool carrier mounted to slide vertically on said column and having tool holders to register with said spindles, and a stop mounted on said column in the path of said tool carrier for positively limiting the downward movement thereof.

32. The combination, with a base and an upright column thereon, of a carrier mounted to revolve on said base concentric with said column, a plurality of work-carrying spindles mounted in said carrier to revolve therewith, a tool carrier mounted to slide vertically on said column and having tool holders to register with said spindles, and an adjustable stop mounted on said column in the path of said tool carrier for positively limiting the downward movement thereof.

33. The combination, with a base and upright standards thereon and a centrally arranged column between said standards, of a carrier mounted to revolve on said base, a plurality of work-carrying spindles mounted in said carrier, a tool carrier mounted to slide on said column and having guides in the opposing faces of said standards, and a stop ring adjustably mounted on said column above said spindles and in the path of said tool carrier.

34. In a lathe, a reciprocating tool carrier, hydraulically operated means for actuating said carrier, a stop in the path of said carrier for positively arresting movement thereof, and means rendered operative by the contact of said carrier with said stop for actuating said hydraulically operated means to reverse said carrier.

35. A revolving work spindle, a reciprocating tool carrier, hydraulically operated means for actuating said carrier, a stop in the path of said carrier for positively arresting movement thereof, and means rendered operative by the engagement of said carrier with said stop for releasing said hydraulically operated means for reversing said carrier.

36. In a lathe, a reciprocating tool carrier, hydraulically operated means for actuating said carrier, a stop in the path of said carrier for positively arresting movement thereof, and a weighted plunger rendered operative by the contact of said carrier with said stop for actuating said hydraulically operated means to reverse said carrier.

37. In a lathe, a tool carrier, a work-carrier, a fluid circulating system communicating with a source of fluid under pressure and connected with both said tool and work carriers, and having fluid actuated means for operating them, and a timing device for said circulating system.

38. In a lathe, a reciprocating tool carrier and operating device therefor, a revolving work-carrying spindle and its operating device, a fluid pressure circulating system connected in parallel circuit with said tool carrier operating device and said spindle operating device for *seriatim* operation thereof, and a timing device for controlling the flow of fluid through said system.

39. The combination, with a reciprocating tool carrier, of a revolving work-carrier, a plurality of work-supporting spindles mounted in said work-carrier and having a revolving movement independently of one another in said carrier, a fluid pressure circulating system communicating with a source of fluid under pressure and having pressure-operated means connected in parallel circuit with said system for operating said reciprocating carrier and said work carrier *seriatim*, and a timing device for controlling the flow of fluid through said circulating system.

40. A revolving work carrier, a plurality of revolving work-supporting spindles mounted therein, a reciprocating tool carrier, a fluid pressure circulating system having means for moving said tool carrier and imparting an intermittent movement to said work carrier, a timing device controlling the movement of said carriers, an operating means for said timing device, and a trip for releasing said operating means.

41. The combination, with a work carrier and a plurality of work-supporting spindles mounted therein, of a reciprocating tool carrier, a fluid pressure circulating system having means for operating said tool carrier, imparting a step by step movement to said work carrier and changing the speed of said work-carrying spindles, and mechanism for effecting the movement of said carriers and spindles *seriatim*.

42. In a lathe, a tool carrier, a revolving work carrier, a plurality of work-carrying spindles mounted in said work carrier, a hydraulic circulating system connected with said tool carrier and also connected with said work carrier and with said work-carrying spindles for operating said tool carrier and work carrier and varying the speed of said work-carrying spindles, and a timing device for said circulating system.

43. A revolving work-carrying spindle, a reciprocating tool carrier, a fluid pressure circulating system having means for controlling the speed of said spindle, and the movement of said tool carrier, a device for timing the operation of said spindle and carrier, an operating mechanism for said timing device, and a trip for releasing said mechanism.

44. A plurality of revolving work-carrying spindles, a reciprocating tool carrier, a fluid pressure circulating system having means for operating said tool carrier, a device for timing the operation of said spindles and said tool carrier, a shifting mechanism for said timing device, and a trip for releasing said shifting mechanism.

45. A revolving work carrier, a plurality of work-carrying spindles mounted therein to revolve therewith and on their own axes, a reciprocating tool carrier, a fluid pressure circulating system having means for revolving said work carrier and reciprocating said tool carrier, a timing device for controlling the cycle of movement of said carriers and spindles, an operating mechanism for said timing device, and a trip device actuated automatically after its initial trip for releasing said operating mechanism.

46. A revolving work carrier, a plurality of work-carrying spindles mounted therein to revolve therewith, a reciprocating tool carrier, a fluid pressure circulating system having means for moving said tool carrier, revolving said work carrier intermittently, said means operating *seriatim* in the complete cycle of movement of said carriers, a timing device and operating means therefor, and a trip actuated automatically after its initial movement, for releasing said operating means.

47. A revolving work carrier having an intermittent movement, a plurality of revolving work-carrying spindles mounted therein, a reciprocating tool carrier, a fluid pressure circulating system and cylinders and pistons therefor arranged to move said tool carrier, revolve said work carrier intermittently and lock said carrier in its chucking or stationary positions, a timing device for controlling the cycle of operation of said carriers, and a trip device for controlling the movement of said timing device.

48. In a multiple spindle lathe, a revolving carrier having a step by step movement, a plurality of work-supporting spindles mounted in said carrier, an inelastic fluid controlled mechanism for operating said work-supporting spindles, an inelastic fluid actuated mechanism for intermittently moving said carrier and a fluid circulating system for said mechanisms.

49. In a lathe, a reciprocating tool carrier and a cylinder therefor having a differential, hydraulically-operated piston, a fluid pressure circulating system connected with said cylinder and a hydraulic pump connected with said cylinder for feeding said carrier and its tools during the cutting portion of its stroke.

50. In a multiple spindle lathe, a revolving work-carrier having a step by step movement, a plurality of revolving work-supporting spindles, a locking device for said carrier, a reciprocating tool carrier, fluid operated means for actuating said tool carrier, said work carrier and said locking device *seriatim*, a fluid circulating system connected with said means and a timer for controlling said fluid operated means.

51. In a lathe, a reciprocating tool carrier and a cylinder therefor having a differential piston, a hydraulic circulating system communicating with both sides of said piston and with a source of inelastic fluid supply under pressure for operating said carrier during the idle part of its stroke, a hydraulic pump connected with said system for feeding said carrier during the working part of its stroke, said pump having a variable speed and an adjustable stroke.

52. In a lathe, a reciprocating tool carrier and a cylinder therefor having a differential piston, a hydraulic circulating system communicating with both sides of said piston and with a source of inelastic fluid supply under pressure for operating said carrier during the idle part of its stroke, a hydraulic pump connected with said system for feeding said carrier during the working part of its stroke, and means for automatically timing the movement of said piston and said pump.

53. The combination, with a reciprocating tool carrier, of a plurality of tool holders mounted thereon, a revolving work carrier having a step by step movement, a plurality of work-holding spindles mounted in said work carrier to register respectively with the tool holders of said tool carrier, the movement of said tool carrier being timed to engage its tools with the work during the stationary periods of said work carrier intermediate to its step by step movement and a fluid pressure circulating system having means for operating said carriers synchronously.

54. In a multiple spindle lathe, a plurality of work supporting spindles and means for operating them at a uniform speed, or at different speeds, and hydraulically controlled means for changing the speed of all the spindles simultaneously at any point of the cut.

55. In a lathe, a tool carrier and means for feeding it at a uniform speed toward the work, and hydraulically controlled means for automatically changing the rate of feed of said carrier at any point of the cut.

56. In a multiple spindle lathe, a revolving carrier having a step by step movement, a plurality of revolving spindles having a change speed, a plurality of work-holding chucks and spindles therefor mounted in said carrier to revolve therewith and having a change speed connection with said first named spindles, an inelastic fluid controlled mechanism for operating said spindles at a variable speed, and an inelastic fluid actuated mechanism for intermittently moving said carrier.

57. The combination, with a plurality of work-supporting spindles, of a reciprocating tool carrier and tool holders mounted therein and adapted to register with said work-supporting spindles, an inelastic fluid controlled mechanism for revolving said spindles, an inelastic fluid actuated mechanism for reciprocating said carrier, and mechanism actuated at a predetermined point in the stroke of said tool carrier for reducing the feed of said carrier and the speed of revolution of said work-carrying spindles.

58. A multiple spindle lathe comprising an intermittently revolving work carrier, a plurality of work-carrying spindles mounted to revolve therewith, means for revolving said spindles on their axes, a reciprocating tool carrier and tool holders therefor, a fluid pressure circulating system having means for operating said tool carrier and imparting an intermittent movement to said work carrier, a device for changing the feed of said tool carrier at a predetermined point, a device for changing the speed of revolution of said work-carrying spindles, means for effecting a synchronous operation of said tool carrier, said work carrier and said spindles, and means for rendering either one or both of said feed changing and speed changing devices operative or inoperative.

59. In a lathe, a revolving work carrier having an intermittent movement, a plurality of work-carrying spindles mounted therein, means for driving said spindles, a reciprocating tool carrier and tool holders therefor, a fluid pressure circulating system having means for moving said work carrier step by step, and reciprocating said tool carrier, and an auxiliary power device included in said circulating system for changing the rate of feed of said tool carrier at a predetermined point in the travel thereof, a trip device for rendering said fluid pressure circulating system operative, and a secondary trip device for rendering said auxiliary power device operative.

60. The combination, with a revolving work carrier having an intermittent movement and a plurality of revolving work-supporting spindles mounted therein to revolve therewith, of a tool carrier, a fluid pressure circulating system having means for reciprocating said tool carrier, imparting a step by step movement to said work carrier and locking said work carrier in its stationary or chucking positions, a timing device, a trip mechanism actuated after its initial movement at predetermined intervals for operating said timing device and releasing the fluid pressure for first locking said work carrier, moving said tool carrier toward the work, reversing the flow of the fluid in said system to reverse said carrier at the end of its working stroke, unlocking said work carrier and moving it a step in its revolution, an auxiliary power device released by said trip mechanism for changing the feed of said tool carrier during the cut.

61. The combination, with a revolving work carrier and a plurality of revolving spindles mounted therein, of a reciprocating tool carrier, a fluid pressure circulating system having means for operating said tool carrier and imparting a step by step movement to said work carrier and locking it in its stationary or chucking positions, a continuously operating pump connected with said circulating system, a valved timing device connected with said system, a trip mechanism, including means for operating the valves of said timing device for first moving said tool carrier toward the work and locking said work carrier, then rendering said pump operative to positively feed the tool carrier as it approaches the work, reversing the direction of movement of the tool carrier and finally unlocking the work carrier and moving it a step in its revolution.

62. The combination, with a revolving work carrier having an intermittent movement and a plurality of revolving, work-supporting spindles mounted therein to revolve therewith, a fluid pressure circulating system having means for reciprocating said tool carrier and imparting a step by step movement to said work carrier, a timing device, a trip mechanism actuated after its initial movement at predetermined intervals for operating said timing device and releasing the pressure in said system for moving said tool carrier toward the work, reversing the flow of the fluid in said system to reverse said carrier at the end of its working stroke, moving said work carrier a step in its revolution, and an auxiliary pump connected with said circulating system and normally inactive, but becoming operative at a predetermined point in the working stroke of said tool carrier and having means for varying its stroke and the speed of said tool carrier during the cut.

63. The combination, with a revolving work carrier having an intermittent movement and a plurality of revolving work-supporting spindles mounted therein to revolve therewith, a fluid pressure circulating system having means for reciprocating said tool carrier and imparting a step by step movement to said work carrier, a timing device, a trip mechanism actuated after its initial movement at predetermined intervals for operating said timing device and releasing the fluid pressure to move said tool carrier toward the work, reversing the flow of the fluid in said system to reverse said tool carrier at the end of its working stroke, and moving said work carrier a step in its revolution, said circulating system also including an auxiliary pump for positively feeding said tool carrier during the latter part of its stroke.

64. The combination, with a revolving work carrier having a step by step movement, of a plurality of work-supporting spindles mounted in said carrier, and revolving independently thereof, a driving mechanism for said work-carrying spindles, a reciprocating tool carrier, means for positively arresting the movement of said tool carrier at the limit of its working stroke, a fluid pressure circulating system having means for feeding said tool carrier and also having means for imparting a step by step movement to said work carrier and locking it during its stationary or chucking periods, a timing device, a trip mechanism actuated at intervals by the movement of said tool carrier for shifting said timing device for the performance of the successive steps in the cycle of operation, and means rendered operative by the engagement of said carrier with said arresting means for reversing the fluid pressure in said system and returning said carrier and the parts connected with said system to their normal position.

65. The combination, with a revolving work carrier, of a reciprocating tool carrier, an inelastic fluid circulating system and an inelastic fluid actuated mechanism connected with said system for operating said tool carrier, a stop in the path of said tool carrier for positively arresting its movement at a predetermined point, and mechanism released by the increased pressure of said inelastic fluid in said system upon contact of said tool carrier with said stop for reversing the direction of movement of said tool carrier.

66. The combination, with a plurality of revolving work-supporting spindles and means for operating said spindles, of a reciprocating tool carrier and tool holders therefor mounted to register with said work-carrying spindles, an inelastic fluid cylinder and piston connected with said tool carrier, and having pipe connections with a source of inelastic fluid under pressure, a stop in the path of said tool carrier for positively limiting the movement thereof toward said work carrier, a stop motion, and means operated thereby for admitting inelastic fluid pressure to said cylinder to move said tool carrier toward the work, and a weighted plunger lifted by the increased pressure in said cylinder when said tool carrier contacts with said stop for tripping said stop motion and changing the direction of flow of said inelastic fluid in said cylinder to reverse said tool carrier.

67. The combination, with a revolving work carrier having a step by step movement, and a plurality of work-carrying spindles and chucks therefor, mounted in said carrier to revolve therewith and independently thereof, of a reciprocating carrier and tool holders therefor arranged opposite said spindles to engage the work carrier thereby, inelastic fluid actuated mechanism for revolving said work carrier and reciprocating said tool carrier toward and from the work, an inelastic fluid controlled mechanism for revolving said work carrier, and mechanism within control of the operator for successively rendering said fluid pressure actuated, and said fluid pressure controlled mechanisms operable.

68. In a multiple spindle lathe, the combination, with a revolving work carrier, and a plurality of work-supporting spindles mounted therein, of a reciprocating tool carrier having tool holders supported opposite said work-carrying spindles, inelastic fluid cylinders and pistons therefor for controlling the operation of said work-supporting spindles and actuating said work carrier and said tool carrier, and for locking said work carrier with its work-supporting spindles in register with said tool holders, and mechanism for synchronizing the movement of said work-supporting spindles and said tool carrier and comprising a valve box and valves therefor having pipe connections with an inelastic fluid supply and with said cylinders, and a stop motion controlled mechanism for actuating said valves to admit fluid pressure to said cylinders or exhaust it therefrom.

69. In a multiple spindle lathe, the combination, with a revolving work carrier and a plurality of work-supporting spindles therein, of a reciprocating tool carrier having tool holders supported opposite said work-carrying spindles, inelastic fluid cylinders and pistons therefor for respectively controlling the operation of said work-supporting spindles and actuating said work carrier with a step by step movement, reciprocating said tool carrier and locking said work carrier with its work supporting spindles in register with said tool holders, a stop motion and mechanism actuated thereby and having pipe connection with an inelastic fluid supply and with said cylinders respectively for actuating their pistons, said stop motion being tripped initially to admit fluid pressure to said cylinders to move and lock said work carrier and feed and reverse said tool carrier synchronously.

70. The combination, with a revolving work carrier having a step by step movement, of a plurality of work-supporting spindles mounted in said carrier and revolving independently thereof, a driving mechanism for said work carrying spindles, a reciprocating tool carrier having tool holders carried thereby to register with said work-carrying spindles, inelastic fluid cylinders and pistons therefor having connections for actuating said work carrier, intermittently locking it between its strokes, and reciprocating said tool carrier toward and from the work, said cylinders and pistons having pipe connections with a source of inelastic fluid supply under pressure, and a stop motion controlled mechanism for regulating the admission of inelastic fluid to said cylinders and the movement of their pistons.

71. The combination, with a revolving work carrier having a step by step movement and a plurality of work-supporting spindles mounted therein, of a reciprocating tool carrier having tool holders supported opposite said work-carrying spindles to register therewith, inelastic fluid cylinders and pistons therefor for actuating said work carrier, reciprocating said tool carrier and controlling the movement of said spindles, said cylinders having pipe connections with a source of inelastic fluid supply under pressure, a single revolution stop motion and trip device therefor, a cam shaft to which said stop motion is geared one to four, whereby said cam shaft will move through an arc of ninety degrees with each tripping of said stop motion, and mechanism actuated by the movement of said cam shaft for admitting inelastic fluid to said cylinders and exhausting it therefrom.

72. The combination, with a work-supporting spindle and means for operating the same, of a tool carrier and tool holder therefor, an inelastic fluid cylinder and piston therefor connected with said tool carrier and having a pipe connection with an inelastic fluid supply under pressure, a variable speed auxiliary power device also connected with said inelastic fluid cylinder for positively feeding said tool carrier at a predetermined point in its working stroke, a stop motion and trip therefor released by the descent of said tool carrier, and mechanism controlled by said stop motion for reducing the speed of said auxiliary power device while the tools are at work.

73. The combination, with a work-supporting spindle and a driving means therefor, of a reciprocating tool carrier and tool holder, inelastic fluid cylinders and pistons therefor having pipe connections with an inelastic fluid supply under pressure for varying the speed of said spindle-operating mechanism and actuating said tool carrier, a variable speed auxiliary power device also connected with said inelastic fluid cylinder for said tool carrier for positively feeding said carrier at uniform speed as it approaches the work, a stop motion, a trip device therefor actuated by the movement of said tool carrier, and mechanism operated by said stop motion for reducing the speed of said auxiliary power device and spindle-operating mechanism during the cutting operation of the tools.

74. In a multiple spindle lathe, the combination, with a revolving carrier and a plurality of work-supporting spindles mounted therein, of a reciprocating tool carrier having tool holders supported opposite said work-carrying spindles, inelastic fluid cylinders and pistons therefor, for controlling the operation of said work-supporting spindles and actuating said work carrier and said tool carrier and for locking said work-carrier with its work supporting spindles in register with said tool holders, and mechanism for synchronizing the movement of said work-supporting spindles and said tool carrier and comprising a valve box and valves therefor having pipe connections with an inelastic fluid supply and with said cylinders.

75. The combination, with a revolving work carrier having a step by step movement, of a plurality of work-supporting spindles mounted in said carrier and revolving independently thereof, a driving mechanism for said work-carrying spindles, a reciprocating tool carrier having tool holders carried thereby to register with said tool-carrying spindles, inelastic fluid cylinders and pistons therefor having connections for actuating said work carrier and reciprocating said tool carrier toward and from the work, said cylinders and pistons having pipe connections with a source of inelastic fluid supply under pressure, and means for synchronizing the movement of said pistons and the cycle of operation of said carriers and spindles.

76. The combination, with a revolving work-carrying spindle, of a reciprocating tool carrier, a fluid pressure circulating system having means for operating said carrier, an auxiliary power device connected with said circulating system, a timing device, a trip mechanism actuated, after its initial movement, successively by said tool carrier for rendering said auxiliary power device operative to positively feed said tool carrier as it approaches the work to change the speed of said auxiliary power device during the cut, and reverse the flow of the circulating fluid in said system, to reverse said tool carrier at the end of its working stroke.

77. The combination, with a revolving work carrier having an intermittent movement and a plurality of revolving work-supporting spindles mounted therein to revolve therewith, of a tool carrier, a fluid pressure circulating system having means for reciprocating said tool carrier, imparting a step by step movement to said work carrier and locking said carrier in its stationary or chucking positions, a timing device, a trip mechanism actuated after its initial movement at predetermined intervals for operating said timing device and releasing the fluid pressure for first locking said work carrier, moving said tool carrier toward the work, reversing the flow of the fluid in said system to reverse said carrier at the end of its working stroke, unlocking said work carrier and moving it a step in its revolution.

78. An automatic multiple spindle lathe comprising a revolving work carrier having a step by step movement, a plurality of work-carrying spindles mounted therein, a reciprocating tool carrier and tool holders mounted to register with said work-carrying spindles, means becoming operative when said tool carrier approaches the work for feeding it positively at uniform speed, means for positively checking the downward movement of said tool carrier, means becoming automatically operable through the checking of said carrier for reversing it and for moving said work carrier a step when said tool holder is near the end of its up-stroke.

79. In a lathe, a tool carrier, a work-carrier, fluid operated means for causing said carriers to act in unison, and a fluid pressure circulating system communicating with a source of fluid under pressure and with the operating means of both said tool carrier and said work-carrier.

80. A hydraulically controlled revolving work carrier having a step by step movement, a plurality of hydraulically controlled revolving work-holding spindles supported in said carrier, and a circulating system communicating with a source of fluid under pressure and with the hydraulic control of said work carrier and said work-holding spindles.

81. A hydraulically controlled revolving work carrier having a step by step movement, a plurality of hydraulically controlled revolving work-holding spindles, a hydraulically controlled device for periodically locking said work carrier against rotation, and a circulating system communicating with a source of fluid under pressure and with the hydraulic control of said work carrier, said spindles and said lock device and forming a circuit between them.

82. In a lathe, a reciprocating tool carrier and cylinder therefor having a differential hydraulically operated piston, and a hydraulically operated auxiliary power device for feeding said carrier and tools during the cutting portion of its stroke and changing the rate of feed.

83. A multiple spindle lathe comprising a revolving work-carrier having a step by step movement, a plurality of revolving work-supporting spindles, a reciprocating tool carrier, fluid operated means having pipe connections in parallel circuit with a source of fluid pressure supply for actuating said tool carrier and said work-carrier *seriatim*, and a timing device for said fluid operated means.

84. In a lathe, a reciprocating tool carrier, a cylinder and piston therefor, a hydraulic circulating system communicating with said cylinder, a hydraulic auxiliary power device connected with said system for feeding said carrier during a portion of said stroke, said auxiliary power device having an adjustable stroke.

85. In a lathe, a reciprocating tool carrier, a cylinder and piston therefor, a hydraulic circulating system communicating with said cylinder, and a hydraulic auxiliary power device connected with said system for feeding said carrier during the cutting portion of its stroke.

86. A reciprocating tool carrier, a hydraulic circulating system having means for operating said carrier, and a hydraulic auxiliary power device connected with said system for feeding said carrier during the cutting portion of its stroke.

87. A reciprocating tool carrier, a hydraulic circulating system having means for operating said carrier, a hydraulic auxiliary power device connected with said system for feeding said carrier during the cutting portion of its stroke, and for varying the rate of feed of said carrier during the cut.

88. A multiple spindle lathe comprising a revolving work carrier having a step by step movement, a plurality of work-supporting spindles, a reciprocating tool carrier, hydraulically operated means for actuating said tool carrier and said work carrier *seriatim*, and power operated means actuated by the movement of said tool carrier for rendering said hydraulically operated means operative.

89. In a multiple spindle lathe, the combination, with a revolving work carrier and a plurality of work-supporting spindles, of a reciprocating, hydraulically operated tool carrier, hydraulically operated means for synchronizing the movement of said work-supporting spindles and said tool carrier, and a stop motion device actuated by the movement of said tool carrier for controlling said synchronizing mechanism.

90. In a lathe, a reciprocating tool carrier, a revolving work carrier having a step by step movement, and a plurality of work-supporting spindles mounted therein, hydraulically operated mechanism for actuating said tool carrier and said work carrier *seriatim*, and a power operated device for synchronizing the movement of said carriers.

91. In a lathe, a reciprocating tool carrier and a cylinder therefor having a differential, hydraulically operated piston, a hydraulically operated auxiliary power device for feeding said carrier during the cutting portion of its stroke and a timing device for controlling the period of operation of said power device.

92. In a lathe, a revolving work supporting spindle, a reciprocating tool carrier, hydraulically operated means for actuating said tool carrier, and a hydraulically operated auxiliary power device becoming operative at a predetermined point in the working stroke of said carrier for positively feeding it to said work supporting spindle, said auxiliary power device having a variable speed.

In witness whereof, I have hereunto set my hand this 19th day of March, 1914.

CONRAD M. CONRADSON.

Witnesses:
GENEVIEVE E. SORENSEN,
EDWARD A. PAUL.